US012061059B2

(12) United States Patent
Glisovic et al.

(10) Patent No.: US 12,061,059 B2
(45) Date of Patent: Aug. 13, 2024

(54) ENHANCED METAL-METAL-MATRIX COMPOSITE WEAPON BARRELS

(71) Applicant: Consulting Group of Jocassee, Inc., Pickens, SC (US)

(72) Inventors: Anja Glisovic, Luebeck (DE); Steve Franklin Gravely, Pickens, SC (US); Joshua Neill Gravely, Pickens, SC (US)

(73) Assignee: Consulting Group of Jocassee, Inc., Pickens, SC (US)

( * ) Notice: Subject to any disclaimer, the term of this patent is extended or adjusted under 35 U.S.C. 154(b) by 853 days.

(21) Appl. No.: 17/017,546

(22) Filed: Sep. 10, 2020

(65) Prior Publication Data

US 2020/0408477 A1 Dec. 31, 2020

Related U.S. Application Data

(63) Continuation-in-part of application No. 15/456,374, filed on Mar. 10, 2017, now abandoned.

(Continued)

(51) Int. Cl.
*F41A 21/24* (2006.01)
*B22F 3/14* (2006.01)
(Continued)

(52) U.S. Cl.
CPC ........... *F41A 21/04* (2013.01); *B22F 3/14* (2013.01); *B22F 3/24* (2013.01); *B22F 5/106* (2013.01);
(Continued)

(58) Field of Classification Search
CPC .......... F41A 21/02; F41A 21/04; F41A 21/20; F41A 21/22; F41A 21/24; F41A 21/44;
(Continued)

(56) References Cited

U.S. PATENT DOCUMENTS 2,845,741 A     8/1958   Day
2,981,155 A * 4/1961   Parlanti ................... F41A 21/20
                                                                                                      42/78

(Continued)

FOREIGN PATENT DOCUMENTS

CA            2284893        1/2011
DE            3035384        5/1982

(Continued)

*Primary Examiner* — John Cooper
(74) *Attorney, Agent, or Firm* — JK Intellectual Property Law, PA

(57) ABSTRACT

Methods of manufacturing metal, metal-matrix, metal-metal-matrix composite weapon barrels offer barrels with improved thermal performance and rigidity with no, minimal or negative weight increase. A barrel may include a barrel core surrounded by a lightweight, thermally conductive sleeve made from metal, metal-matrix composite (MMC) materials, also referred to as metal-matrix material. The barrel core and barrel sleeve may include aligning features to prevent separation and movement of the sleeve along the core. The disclosed methods provide for material combinations and part designs that prevent separation of their parts over the life of the weapon barrel and allow the barrel to perform at high cadence over the whole temperature range the barrel is used.

7 Claims, 18 Drawing Sheets

Related U.S. Application Data

(60) Provisional application No. 62/306,375, filed on Mar. 10, 2016.

(51) Int. Cl.
  *B22F 3/24* (2006.01)
  *B22F 5/10* (2006.01)
  *B22F 7/08* (2006.01)
  *B23P 11/02* (2006.01)
  *F41A 21/04* (2006.01)
  *F41A 21/12* (2006.01)
  *F41A 21/20* (2006.01)

(52) U.S. Cl.
  CPC ............... *B22F 7/08* (2013.01); *B23P 11/025* (2013.01); *F41A 21/12* (2013.01); *F41A 21/20* (2013.01); *F41A 21/24* (2013.01); *B22F 2003/248* (2013.01)

(58) Field of Classification Search
  CPC .... B22F 3/14; B22F 3/24; B22F 5/106; B22F 7/08; B22F 2003/248; B23P 11/025
  USPC ............ 89/14.1; 42/76.01, 76.02, 76.1
  See application file for complete search history.

(56) References Cited

U.S. PATENT DOCUMENTS

| | | |
|---|---|---|
| 3,118,243 A | 1/1964 | Manshe |
| 4,419,400 A | 12/1983 | Hindersinn |
| 4,841,836 A | 6/1989 | Bundy |
| 5,794,374 A | 8/1998 | Crandall |
| 6,482,248 B1 | 11/2002 | Holloway |
| 6,497,065 B1 | 12/2002 | Huston |
| 7,921,590 B2 * | 4/2011 | Briggs ............ F41A 21/04 42/76.02 |
| 9,823,034 B2 * | 11/2017 | Johnson ............ F41A 21/36 |
| 10,001,337 B2 * | 6/2018 | Curliss ............ F41A 21/20 |
| 11,709,030 B2 * | 7/2023 | Baker ............ F41A 21/22 42/76.01 |
| 2004/0244257 A1 * | 12/2004 | Degerness ............ F41A 21/02 42/76.02 |
| 2005/0262997 A1 | 12/2005 | Brixius |
| 2006/0024490 A1 * | 2/2006 | Werner ............ C22C 47/06 428/323 |
| 2007/0193102 A1 * | 8/2007 | Briggs ............ F41A 21/04 42/76.02 |
| 2011/0113667 A1 * | 5/2011 | Adolphsen ............ F41A 21/36 42/76.01 |
| 2011/0277623 A1 * | 11/2011 | Adolphsen ............ F41A 5/06 89/193 |
| 2012/0227302 A1 | 9/2012 | Fonte |
| 2013/0247439 A1 | 9/2013 | Johnson |
| 2015/0352750 A1 * | 12/2015 | Adolphsen ............ B29C 39/10 264/279 |
| 2016/0003570 A1 * | 1/2016 | Tonkin ............ F41A 21/04 89/14.4 |
| 2016/0320156 A1 | 11/2016 | Curliss |

FOREIGN PATENT DOCUMENTS

| | | |
|---|---|---|
| DE | 102013016736 | 4/2015 |
| WO | 2011146144 | 11/2011 |

\* cited by examiner

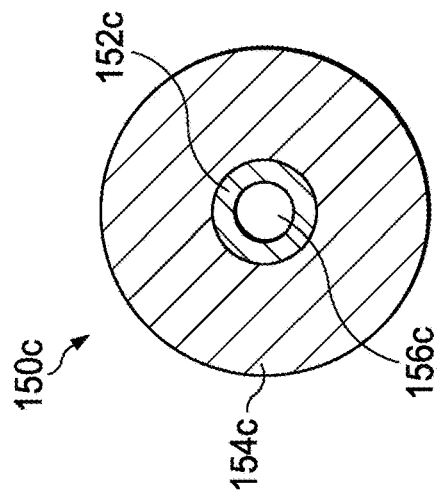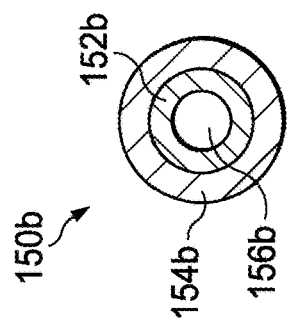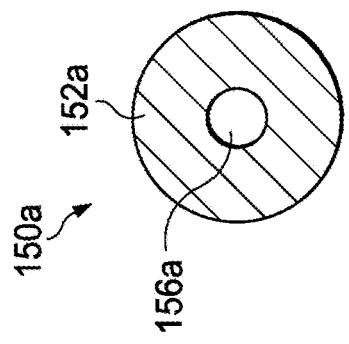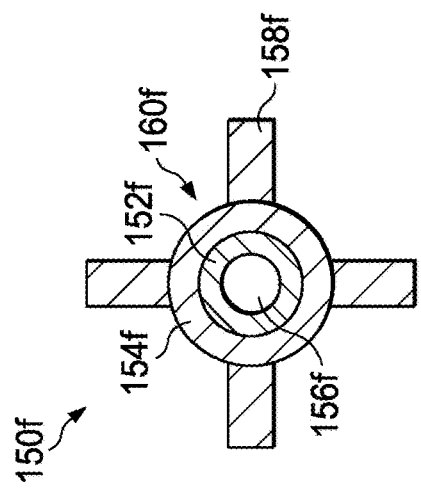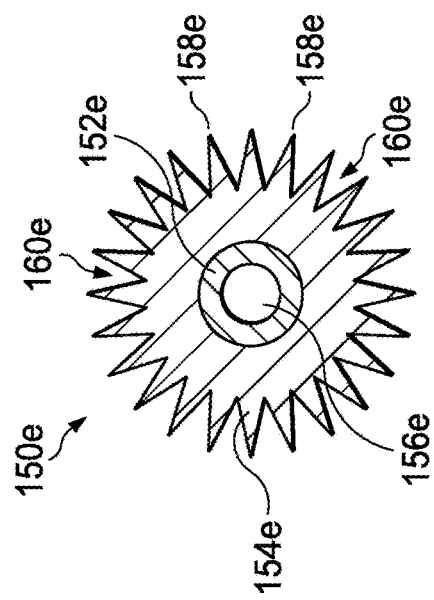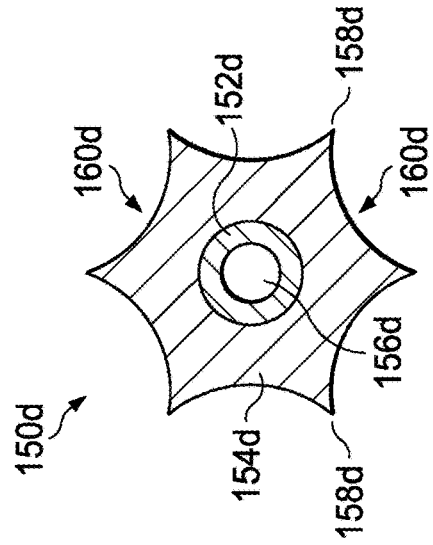

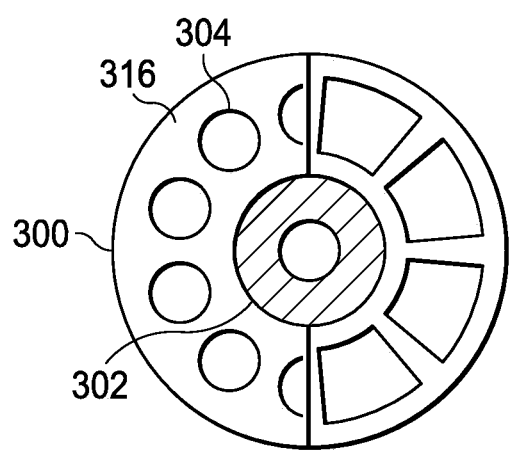
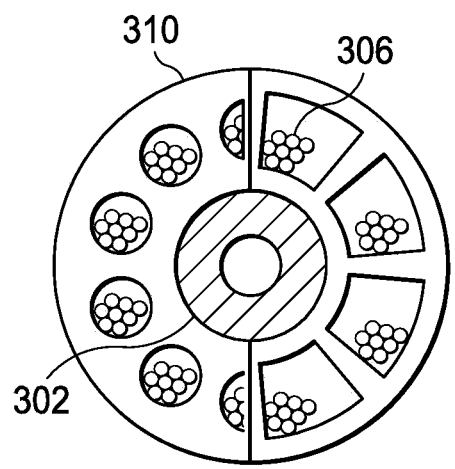
FIG. 4A  FIG. 4B
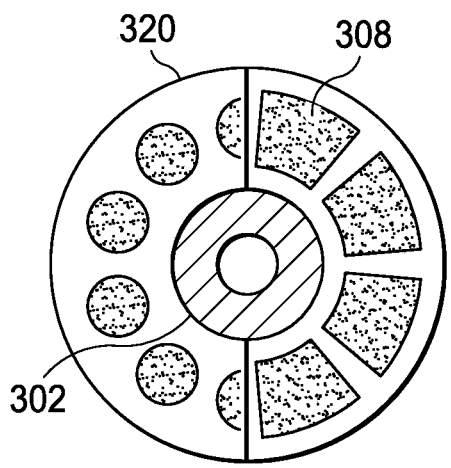
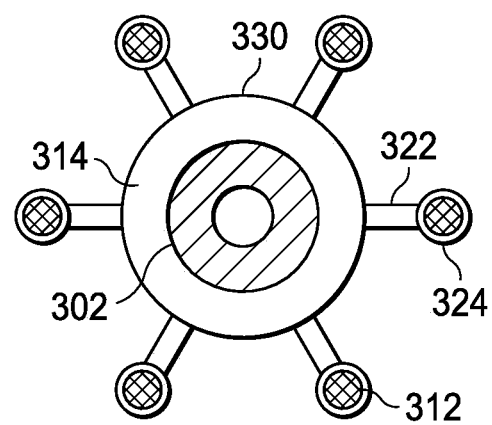
FIG. 4C  FIG. 4D
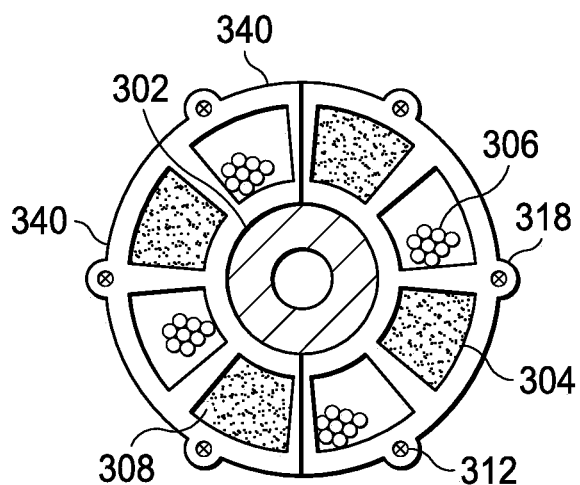
FIG. 4E

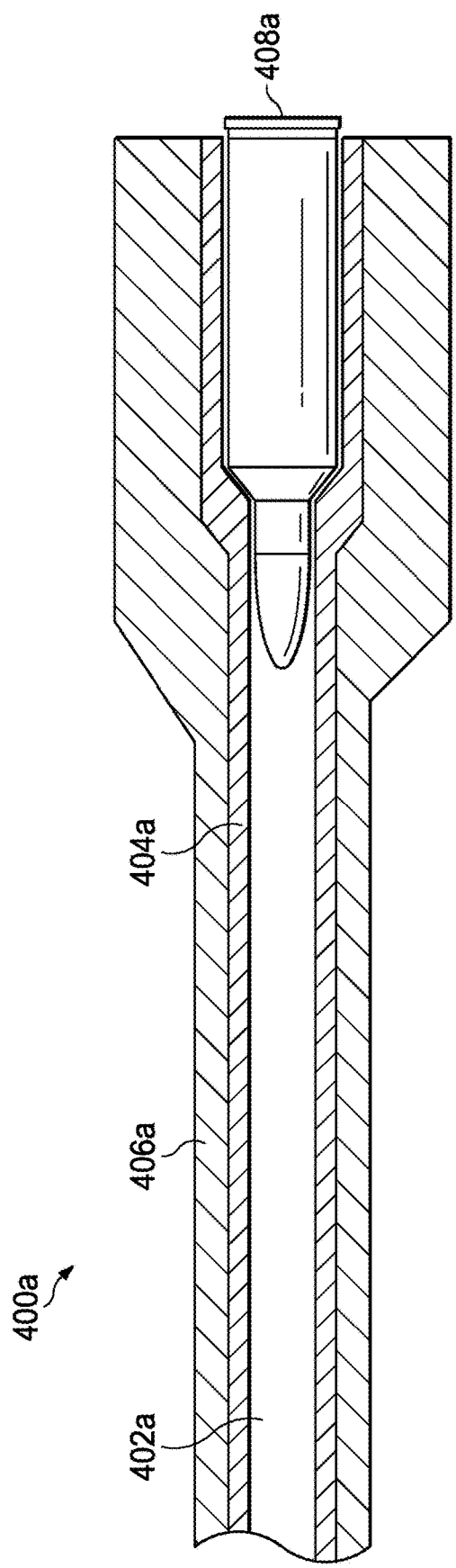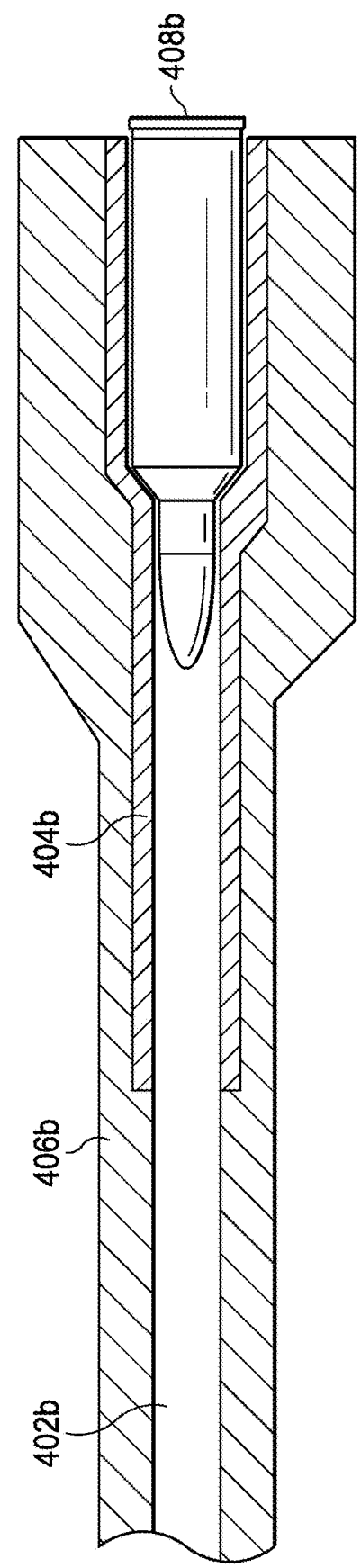
FIG. 5A
FIG. 5B

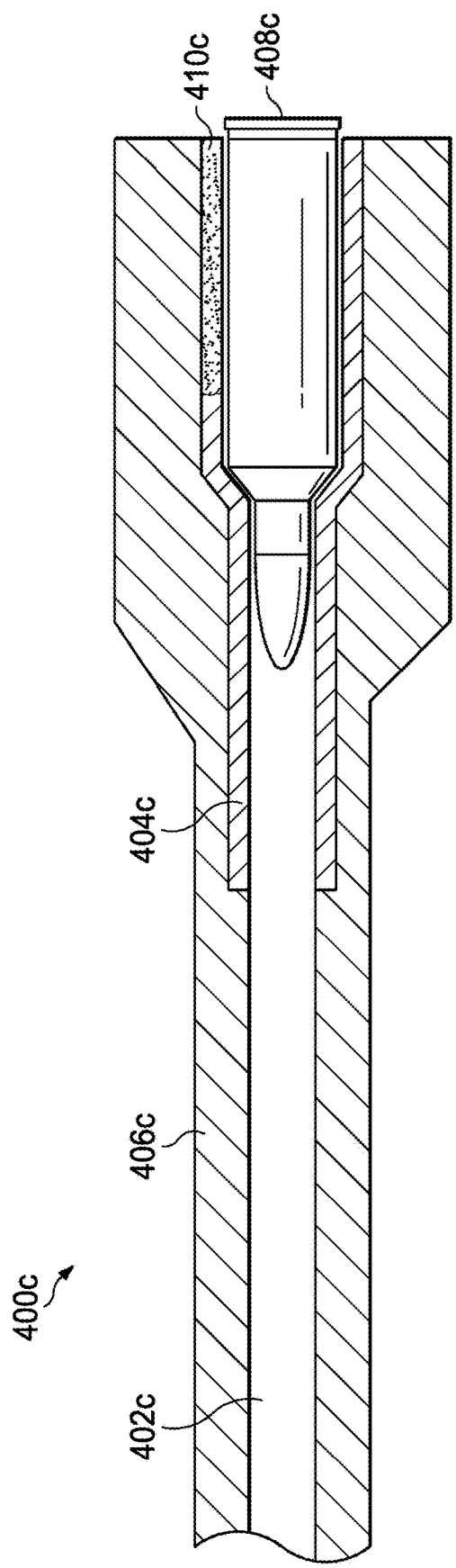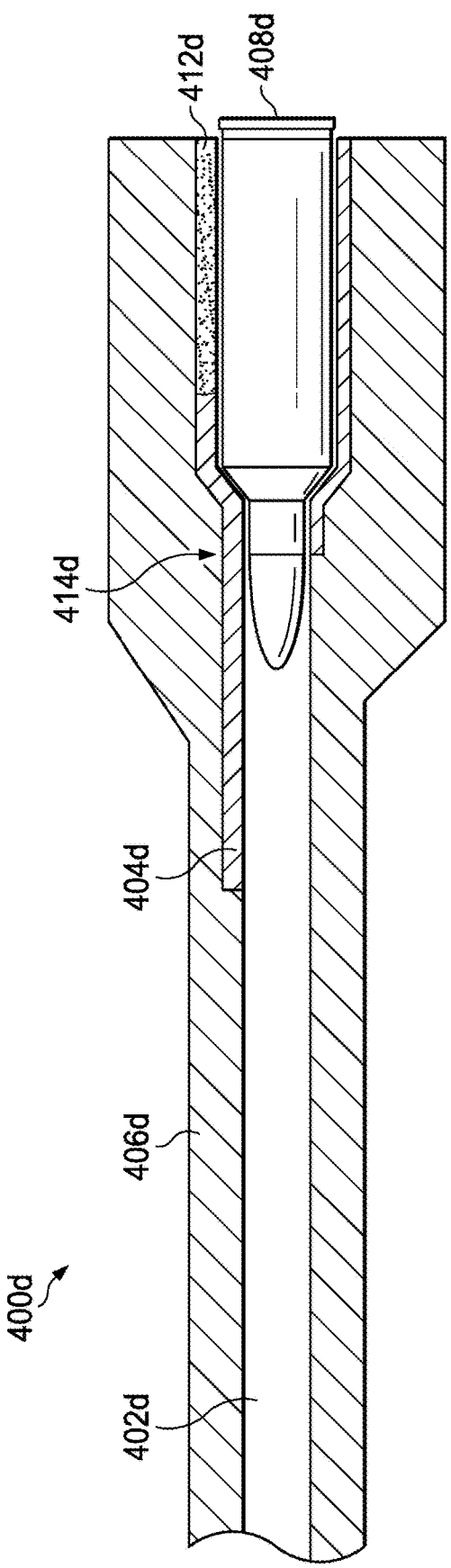

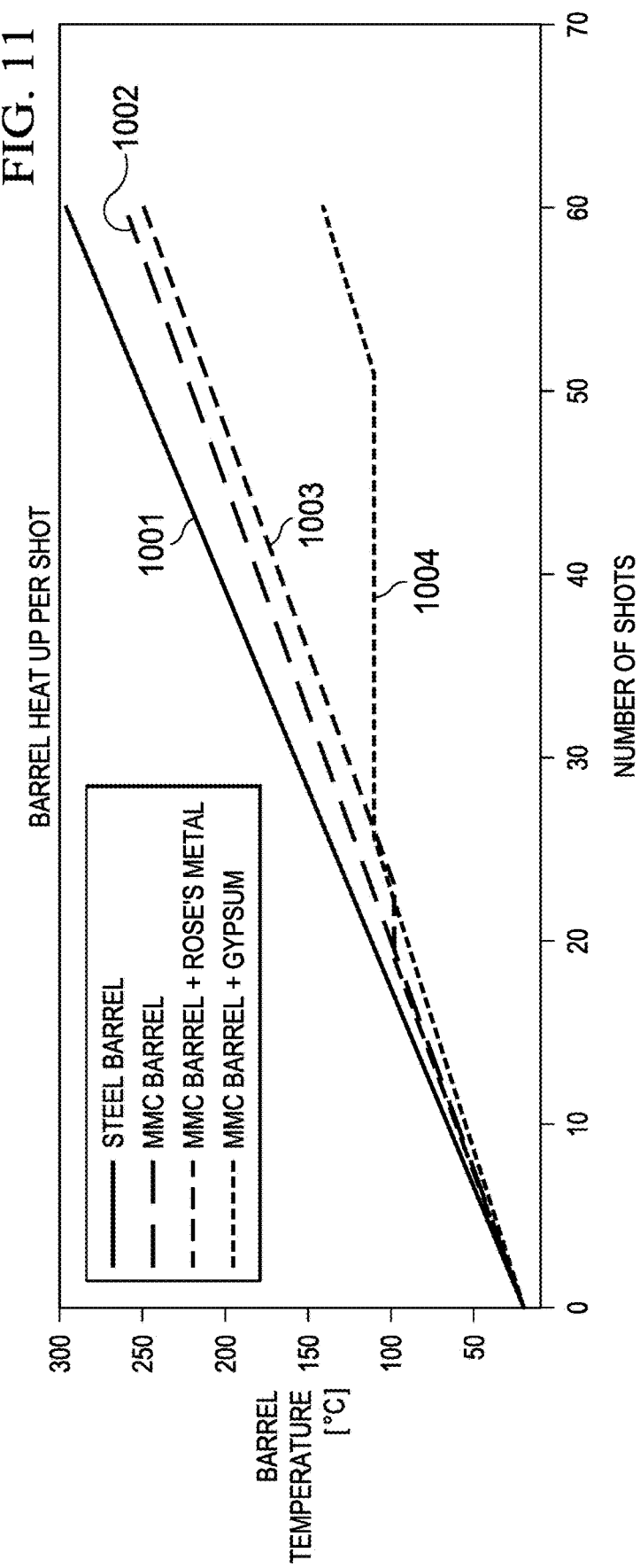

ENHANCED METAL-METAL-MATRIX COMPOSITE WEAPON BARRELS

CLAIM OF PRIORITY

This application claims priority to and the benefit thereof from U.S. Provisional Patent Application No. 62/306,375 filed on Mar. 10, 2016, titled "ENHANCED METAL-METAL-MATRIX COMPOSITE WEAPON BARREL," and pending U.S. patent application Ser. No. 15/456,374, the entirety of which is hereby incorporated by reference.

TECHNICAL FIELD

The present disclosure relates generally to composite weapon parts, their design and materials used in the fabrication of ballistic weapons and, more particularly, barrels for use with ballistic and non-ballistic weapons.

BACKGROUND

Certain weapons, including mortars, canons, machine and Gatling guns, railguns, long range, bolt, automatic, and semi-automatic rifles, may experience heating when firing. This heating can result then in deformation of the barrel, which in turn can degrade the accuracy of the weapon. In applications in which accuracy is paramount, e.g., in a firelight or a sniper setting, deformation due to heating can compromise the effectiveness of the weapon. To enhance the ability of weapon barrels to dissipate heat and thereby maintain accuracy through periods of extended, high-frequency firing, a number of enhancements are provided to maintain barrel shape and rigidity as the gun barrel experiences heating, cooling and mechanical agitation such as vibration and recoil. The disclosed enhancements improve the ability of the gun barrel to quickly dissipate heat, to dampen barrel whip and increase stiffness, thereby further mitigating the negative effects of heating and vibrations induced by rapid firing. The enhancements include material compositions and suitable material combinations, part designs and combinations as well as methods of manufacturing the barrel, joining parts and part shapes/designs which allow the barrels to function as described.

BRIEF DESCRIPTION OF THE DRAWINGS

FIGS. 2A-2F show schematic, radial cross-sections of embodiments of a conventional weapon barrel and weapon barrels in accordance with the illustrative embodiments;

FIGS. 4A-4E show schematic, radial cross-sections of embodiments of weapon barrels in accordance with the illustrative embodiments, wherein FIGS. 4A, 4B, 4C, and 4F include vertical dividing lines such that each half of the figure may illustrate an alternative embodiment;

FIGS. 5A-5D show schematic, longitudinal cross-sections of weapon barrels in accordance with the illustrative embodiments;

FIG. 11 is a graph showing calculated heat for four different barrels; and

Figure 1:
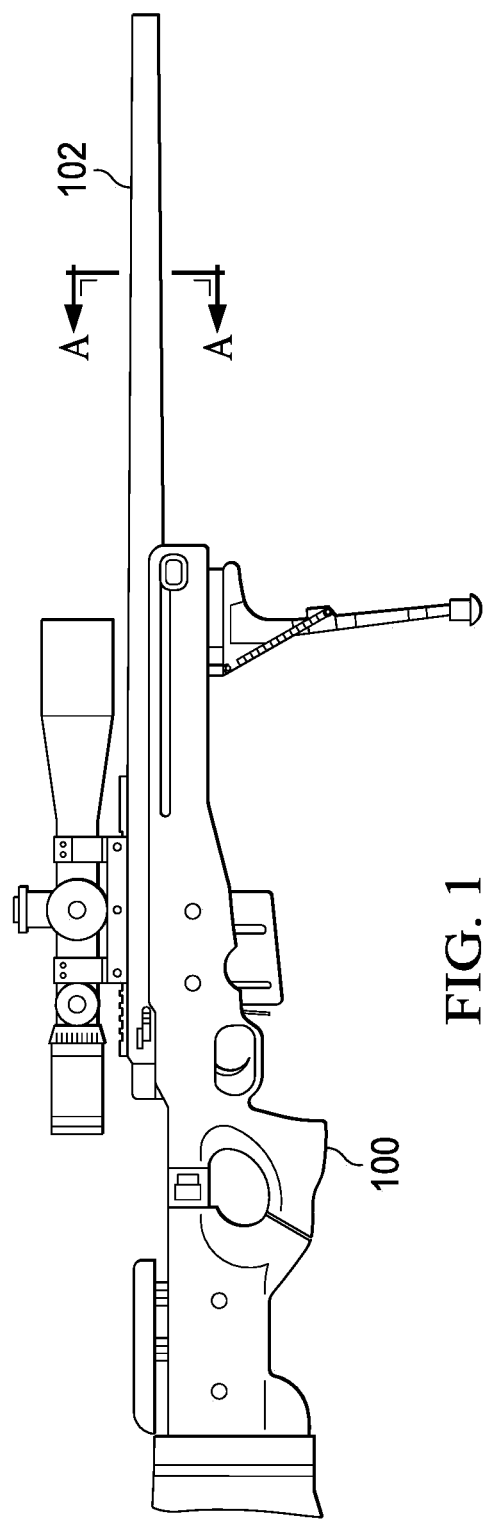
FIG. 1 shows a schematic, perspective view of an exemplary weapon, namely a sniper rifle.

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. The figures should not be viewed as exclusive embodiments, as the subject matter disclosed is capable of considerable modifications, alterations, combinations, and equivalents in form and function, without departing from the scope of this disclosure.

SUMMARY

In an illustrative embodiment, a method of manufacturing a weapon barrel includes providing an inner core. The inner core has an annular, circumferential ridge extending from an external surface of the inner core. The method further includes enclosing the inner core with an outer sleeve that surrounds the circumference of the inner core over at least a portion of a length of the core, and joining the outer sleeve to the core.

In another illustrative embodiment, a weapon barrel includes an inner core that has an inner core, the inner core comprising an annular, circumferential ridge extending from an external surface of the inner core. The weapon barrel further includes an outer sleeve that is permanently joined to the inner core. The outer sleeve includes an annular, circumferential groove extending from an internal surface of the outer sleeve. The annular, circumferential groove of the outer sleeve is sized and configured to engage the annular, circumferential ridge of the inner core.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken as limiting.

The present disclosure relates generally to firearms having a barrel core surrounded with a metal or metal-matrix sleeve in such a way as to improve the firearm's stiffness without excessive increases in weight. Conventional barrels having increased thickness for improved stiffness and accuracy are known as heavy or bull barrel profiles and may be found in, for example, sniper rifles. Such conventional barrels are typically made from homogeneous metal alloys, usually steels (iron alloys/ferrous alloys), copper alloys (brass or bronze), cobalt alloys and nickel alloys.

The barrel portion of a firearm is generally built to withstand the pressure of the firing load and the bullet while providing enough stiffness for sufficient accuracy. This criteria may be achieved simply using a barrel of high or increased wall thickness, as increasing wall thickness increases the maximum pressure load the barrel can bear and also improves stiffness by virtue of enlarged barrel diameter and correspondingly increased second moment of area, which is exemplary shown in the different barrel profiles of FIGS. 8A and 8B below. These advantages are offset by a corresponding increased barrel weight, which may detract from the wieldability and usability of the weapon.

To that end, the present disclosure describes embodiments of enhanced weapon barrel and methods of fabrication of such enhanced weapon barrels. Relative to conventional weapon barrels, the disclosed weapon barrels may have an increased diameter without the expected corresponding increase in barrel weight. Indeed, in some embodiments, barrel weight may even be decreased even where the outer diameter of the weapon barrel is increased.

One method for fabricating a weapon barrel that is light in weight while also having an increased diameter (as opposed to a conventional, single-material barrel) is to create a metallic barrel having a thin wall thickness and to wrap barrel with a carbon fiber composite. Such composites usually consist of a resin matrix based on epoxy resins. Carbon fiber composites provide the advantage of being light-weight and strong (normally having a specific tensile strength higher than steels and nickel alloys). A carbon fiber-wrapped barrel may therefore be lighter than a conventional barrel made from a steel or similar metal barrel. Such barrel configurations, however, may have the disadvantage of low thermal stability. Low thermal stability effectively restricts use of such barrels in semi or fully automatic weapons to a few close-together shots. The low thermal stability also results in limiting deployment of the barrel to systems in which the temperature of the barrel does not rise above 100° C. for extended periods of times. At higher temperatures, the organic resin matrix will degrade permanently. Moreover, since carbon fiber composite wraps also act as an insulator due to their low thermal conductivity. Conventional carbon fiber therefore limits the ability of the barrel to dissipate heat, which may in turn detract from the precision of the weapon by facilitating thermal barrel creep.

Other types of multi-material barrels may be found in smooth bore cannons, such as those deployed in Abrams and Leopard II battle tanks. These barrels actually have an insulating outer layer for thermal management. The insulating layer increases barrel diameter, but unlike the aforementioned carbon fiber outer layer, does not enhance the mechanical integrity or stiffness of the barrel.

Another form of a multilayered barrel includes an outer metal sleeve, with a void between the barrel and the sleeve being sealed with a light, hardening filler material. Such fillers may, however, be poor thermal conductors and may therefore contribute to hot spots and thermal creep. Such barrels may be ill-suited for use in semi and fully automatic weapons because the sustainable rate of fire would be reduced to prevent overheating and thermal creep. Also, the sleeve may be susceptible to separation from the filler material and barrel due differential rates of thermal expansion, thereby compromising the barrel's mechanical integrity and accuracy.

The embodiments described herein address the aforementioned issues by providing for structures, sleeve materials, material compositions, and corresponding manufacturing and joining techniques for enhanced weapon barrels that perform well as low cadence weapons (e.g. bolt action rifles) and as high cadence weapons (e.g., Gatling guns, machine guns and automatic rifles). The disclosed embodiments offer enhancements in terms of weight reduction, improved thermal performance and improved accuracy (or a combination of the foregoing) relative to conventional weapon barrels and are fabricated in a manner that does not permit separation of barrel components during the working life of the weapon.

The embodiments of composite weapon barrels described herein offer improved thermal performance and rigidity with little or no increase in weight as compared to traditional barrels, as described below with respect to Examples 3 and 4. Turning now to the figures, FIG. 1 shows an exemplary weapon 100 (shown here as a sniper rifle) in accordance with the illustrative embodiments. The weapon 100 is illustrated as a sniper rifle. It is noted, however, that the concepts described herein may be similarly applicable to barrels of other types of weapons, e.g. bolt-action rifles, fully and semi-automatic rifles, mortars, canons, etc. The weapon 100 includes a barrel 102. The barrel 102 may be formed using any of the of the manufacturing techniques and design features described herein and in accordance with any combination of the features of the various embodiments. To that end, a number of illustrative cross-sections, which may be perceived as being taken along section lines A-A of FIG. 1, are shown and described below.

A first group of embodiments of barrels 102 are shown in FIGS. 2A-2C. FIG. 2A shows a conventional barrel 150a, having a single material barrel core 152a. In the embodiments of FIGS. 2B-2F, the core 152(b-f) is shown as being joined to and enclosed within a sleeve 154(b-f). For example, FIG. 2B shows a composite barrel 150b, having an inner core 152b and an outer sleeve 154b. In the embodiment of FIG. 2B, the thickness of the sleeve 154b is slightly greater but comparable to the thickness of the core 152b. FIG. 2C shows a composite barrel 150c, having an inner core 152c and an outer sleeve 154c. In the embodiment of FIG. 2C, the thickness of the sleeve 154c is much greater than (by approximately a factor of 5) the thickness of the core 152c.

Additional embodiments are shown in FIGS. 2D-2F. In FIG. 2D, the core 152d is shown as being cylindrical and the sleeve 154f is shown as having the shape of a six-pointed star, with arcuate sections 156d between points 158d. FIG. 2E shows a similar embodiment, in which the sleeve 154e surrounding the core 152e has a larger number of elongated fins 158e separated by gaps 160e. In this embodiment, the fins 158e are operable to conduct heat away from the core 152e and offer increased surface area to dissipate heat generated by firing of the weapon to the external environment. FIG. 2F shows a similar embodiment of a barrel 150f in which the core 152f is joined to and surrounded by sleeve 154f. The sleeve 154f has a cylindrical portion 160f coupled to or formed integrally with fins 158f spaced at ninety degree intervals about the circumference of the barrel 150f.

Referring again (for illustrative purposes) to FIG. 2B, the barrel 150b is formed from a barrel core 152b surrounded by sleeve 154b. The sleeve 154b may be a lightweight, thermally conductive sleeve 154b made from one or more metal matrix composite (MMC) materials. Such materials may also be referred to as metal matrix materials. In the illustrative embodiment of FIG. 2C, the increased diameter of the sleeve 154c improves the barrel's stiffness and the sleeve's ability to conduct heat from the barrel core 152c and distributes the heat more evenly along the external surface of the barrel 150c. In such embodiments, hot spots are reduced and more surface area can contribute to heat dissipation.

The increased diameter also allows integration of phase changing and/or vibration dampening materials. Examples of phase change materials include materials that are suited for latent heat storage, such as salts, polymers, paraffins and waxes, calcium sulfate, fusible metal alloys like Rose's metal and Galinstan. Correspondingly, examples of vibration dampening materials include springs, granular or powdery matter like sand, lead shot and non-Newtonian fluids. The use of phase change materials may improve barrel performance by allowing several consecutive shots to be taken at the same barrel temperature and thereby preventing thermal creep of the barrel (see discussion below of Example 5). Similarly, the use of vibration dampening materials may help to reduce recoil, and aid user comfort and accuracy. The increased barrel diameter further allows efficient surface patterning to increase the surface-to-specific heat ratio and thereby improves the cooling efficiency of shaped barrels, such as those described with regard to FIGS. 2D-2F. It is noted that while the above-mentioned embodiments depict longitudinal structures that extend over at least a portion of the barrel's length, radial structures are also contemplated as an aspect of this disclosure. To that end, each of the longitudinal features of, for example, FIGS. 2C (fins 158f) and 4A-4E may alternatively be implemented as radial or annular structures (e.g., ring-shaped structures) that are placed at intervals along the length of the barrel to increase surface area and to otherwise enhance cooling properties.

Figure 13A:
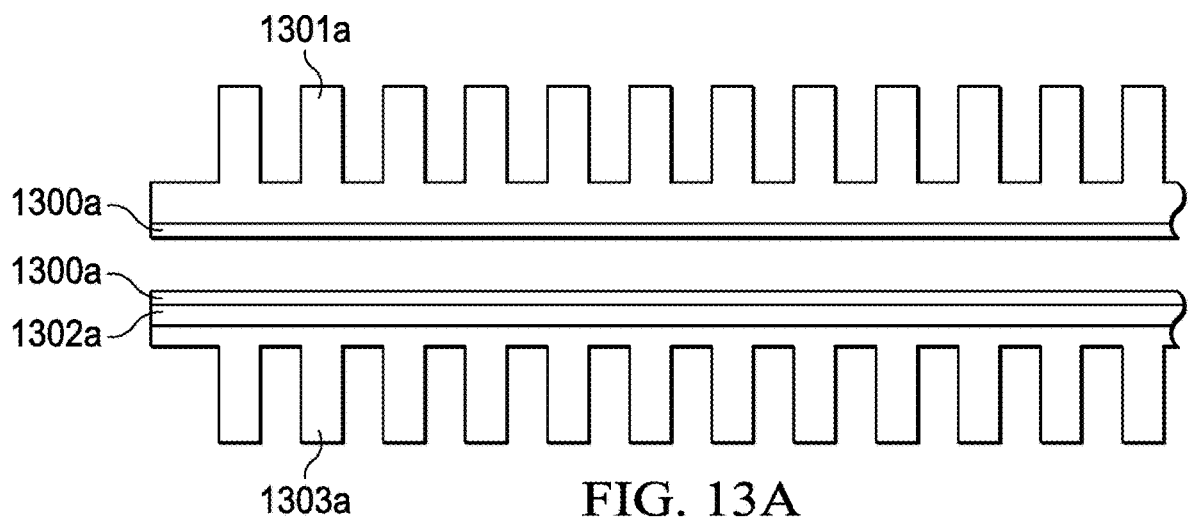
FIGS. 13A-13D show schematic, longitudinal cross sections of a plurality of embodiments barrels having annular fins.

FIGS. 13A-13E show a plurality of embodiments of longitudinal barrel cross sections having annular fins. The top portion of FIG. 13A shows an embodiment having a sleeve 1301a that has annular fins 1303a. The annular fins 1303a have a rectangular cross-section and the sleeve 1301a is directly joined with the barrel core 1300a. Such a profile can be machined into a sleeve or manufactured near-net-shape with a HIP manufacturing technique, as described below. This configuration provides stiffness, pressure resistance and increased surface area. In some embodiments, as shown in the lower portion of FIG. 13A, an optional intermediate layer 1302a of a material with a thermal expansion coefficient larger than that of the sleeve 1301a and core 1300a can be added to enhance mechanical integrity during thermal shrinking and expansion, as described previously.

Figure 13B:
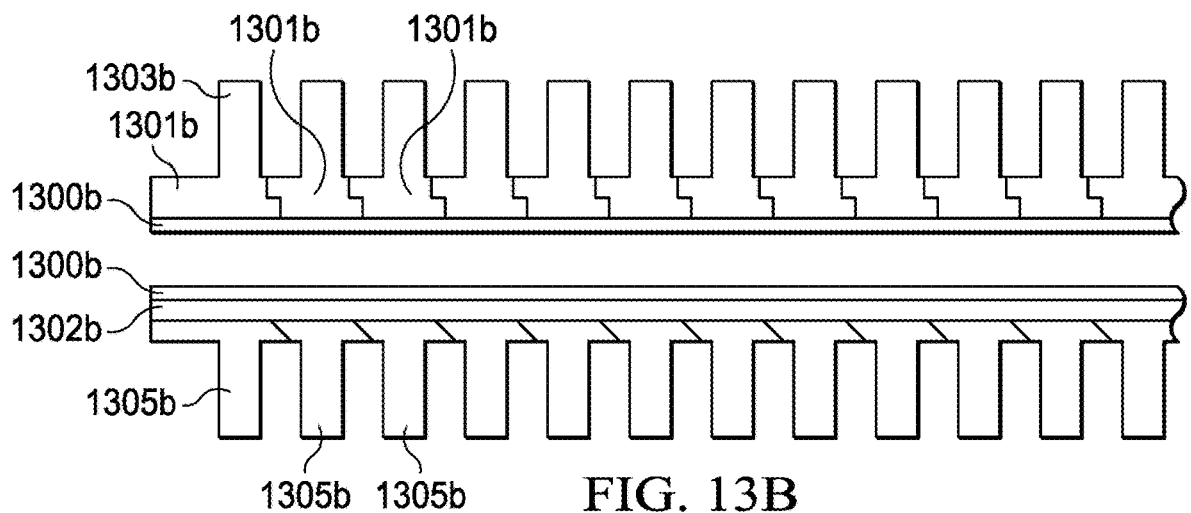
Figure 13C:
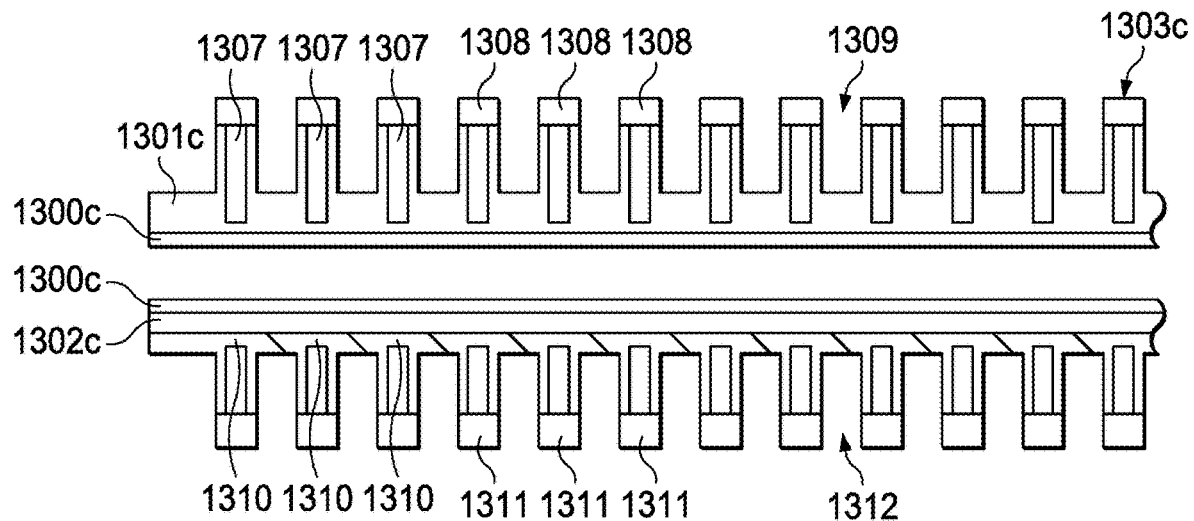
Figure 13D:
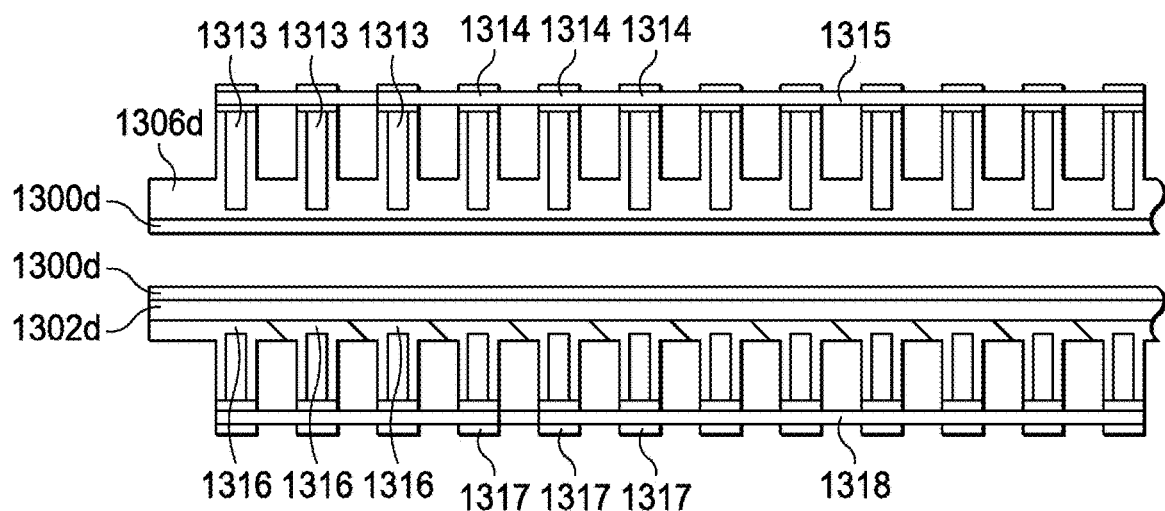

The top portion of FIG. 13B shows an embodiment having a sleeve 1301b that has annular fins 1303b and is analogous in most respects to the embodiment of the top portion of FIG. 13A. The annular fins 1303b have a rectangular cross-section and the sleeve is directly joined with the barrel 1300b. Here, the sleeve is made up of a plurality of sleeve segments 1301b, each of which may be joined together to form a continuous sleeve. The sleeve segments 1301b may be a plurality of interlocking segments or, as shown with respect to the embodiment of the lower portion of FIG. 13B, a plurality of overlapping segments 1305b. The aforementioned segments may be assembled by shrink-fitting, soldering, gluing, fasteners, or another suitable joining method that provide a suitable thermal coupling to the barrel core 1300b. The top portion of FIG. 13C shows an embodiment having a sleeve 1301c that has annular fins 1303c and is analogous in most respects to the embodiment of the top portion of FIG. 13A. The annular fins 1303c have a rectangular cross-section and the sleeve is directly joined with the barrel 1300c. Here, the annular fins 1303c are formed with voids 1307 that can be filled with phase changing materials or other filler materials to tune the thermal or dampening properties of the barrel. Subsequent to filling, caps 1308 may be used to enclose the filler material.

The embodiment of the lower portion of FIG. 13C is analogous in most respects to that of the upper portion, except that the sleeve is made up of a plurality of overlapping segments 1310 that may be joined to an intermediate layer 1302c to form a sleeve. Gaps 1309 and 1312 are positioned between the annular fins to facilitate airflow and heat transfer. For similar reasons, the caps 1308 and 1311 may be omitted to further increase exposed surface area. The embodiments of the top portion and bottom portion of FIG. 13D, respectively, are analogous to the embodiments of FIG. 13C, with the exception that the caps 1314 and 1317 include passages to receive stiffening rods 1315 and 1318, which extend through the caps 1314 and 1317 of the annular finds 1313 and 1316.

Figure 14A:
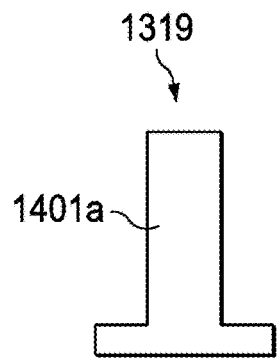
FIGS. 14A-14I illustrate alternative embodiments of annular fin profiles.
Figure 14B:
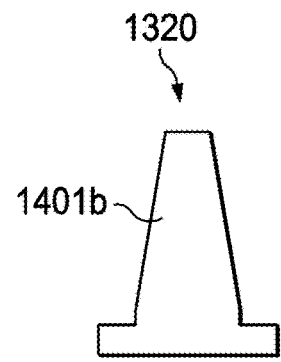
Figure 14C:
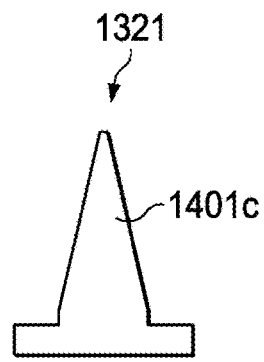
Figure 14D:
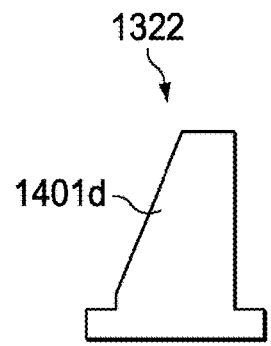
Figure 14E:
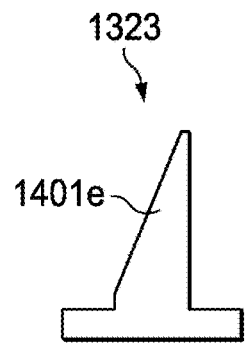
Figure 14F:
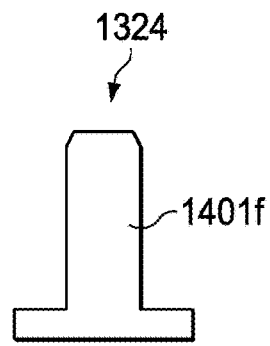
Figure 14G:
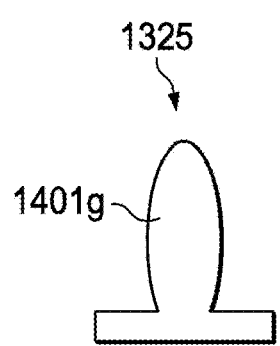
Figure 14H:
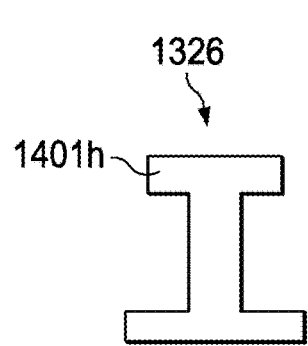
Figure 14I:
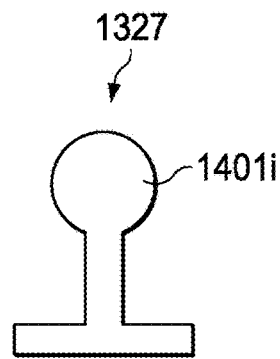

FIGS. 14A-14I illustrates alternative embodiments of fin profiles that may be used to form the aforementioned annular fins. Each profile provides different gripping and heat transfer properties. To that end, FIG. 14A illustrates an annular fin having a rectangular profile 1401a; FIG. 14B illustrates an annular fin 1401b having a flattened, partial conical profile; FIG. 14C illustrates an annular fin 1401c having a triangular profile; FIG. 14D illustrates an annular fin 1401d having an asymmetrical flat cone profile FIG. 14E illustrates an annular fin 1401e having an asymmetrical triangle profile; FIG. 14F illustrates an annular fin 1401f having a rounded rectangular profile; FIG. 14G illustrates an annular fin 1401g having an ovoid profile; FIG. 14H illustrates an annular fin 1401h having a T-shaped profile; and FIG. 14I illustrates an annular fin 1401i having a partially rectangular profile with a bulb-shape profile placed atop a rectangular portion of the annular fin 1401i. Assembled, the annular fin embodiment may appear as discs, cylinders, stubs, or spikes extending radially from a gun barrel.

Referring again to FIG. 2B, the materials used to fabricate the components of the barrel (e.g., barrel 150b) may be selected such that the material properties enable the components to function or to be assembled in a complementary fashion. For example, thermal expansion coefficients of the sleeve 154b and core 152b may be selected to provide for a suitable joint between the sleeve 154b and core 152b. In the preferred embodiments, the sleeve 154b and core 152b are both mechanically coupled and thermally coupled. To that end, the sleeve 154b may be joined to the core 152b by a suitable manufacturing technique to provide a high degree of coupling. Examples of such manufacturing techniques include hot isotactic pressing (HIP), explosion welding and shrink fitting. In the case of shrink fitting, the sleeve 154b may be heated to a very high temperature and fitted around the core 152b. In accordance with other techniques, (e.g., additive manufacturing or sintering), the sleeve 154b may be consolidated from a powder that fuses together around the core 152b. Other methods (e.g., press-fitting) and retrofitting are also discussed below. In a preferred embodiment, fabrication of the barrel 150b includes forming a joint that gives structural and thermal integrity over the whole operating temperature range of the barrel 150b when the barrel 150b is in use at the highest expected cadence.

Metal Matrix Material Properties and Components

Barrels utilizing the technology disclosed herein provide a number of advantages with respect to mechanical and thermal properties. In accordance with the illustrative embodiments, a weapon barrel is disclosed that utilizes a core and sleeve design to form a composite barrel and methods to make the same. The parts are joined by heat and positive pressure to form one unit, which can't be separated without destroying the barrel after the joining process. In this embodiment, the outer sleeve comprises an annular, circumferential groove extending from an internal surface of the outer sleeve, the annular, circumferential groove being sized to engage the annular, circumferential ridge. Here, the core and sleeve are joined permanently such that all parts contribute to the barrel's ability to withstand the pressure of the bullet and the bullet propelling gases.

Figure 3A:
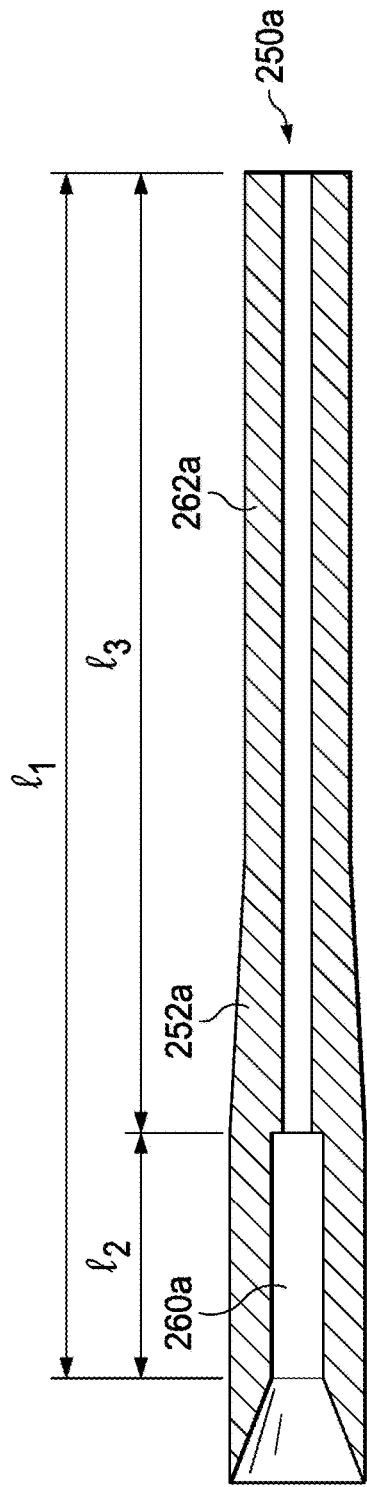
FIGS. 3A-3E show schematic, longitudinal cross-sections of a conventional weapon barrel and weapon barrels in accordance with the illustrative embodiments, including an embodiment having an annular, circumferential ridge.
Figure 3B:
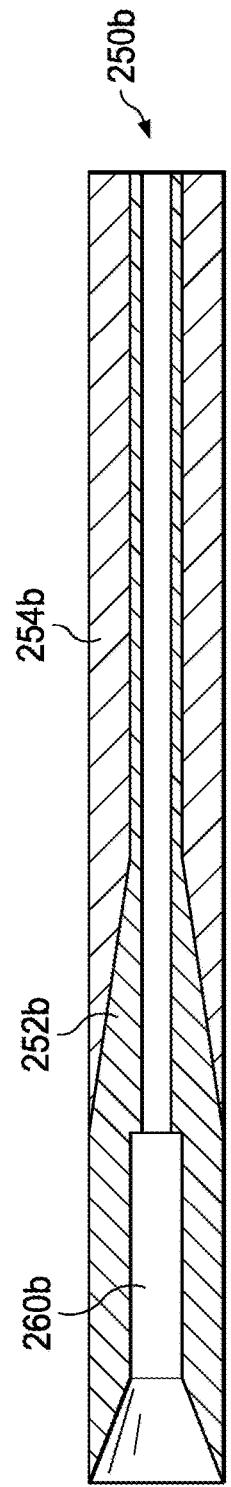
Figure 3C:
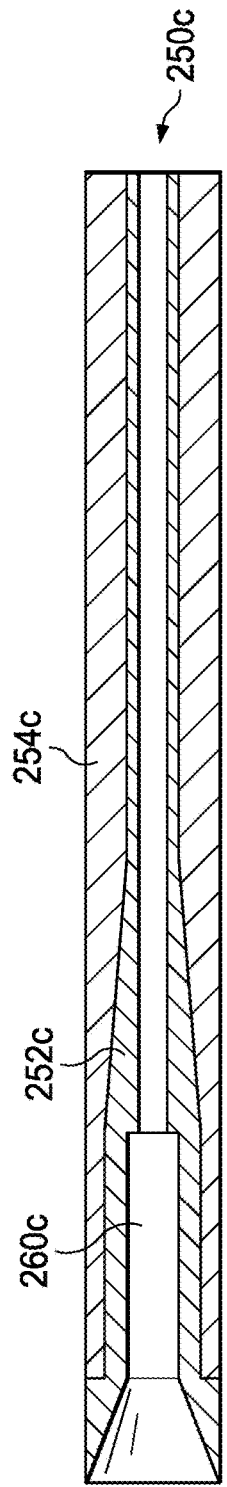

To that end, FIGS. 3A-3D show longitudinal cross-sections of barrel embodiments. FIG. 3A shows a conventional barrel 250a made from a single material core 252a. Here, $l_1$ indicates the length of the overall barrel assembly, including the barrel and breach, $l_2$ indicates the length of the breach 260a, and $l_3$ indicates the length of the remainder of the barrel 250a adjacent to the breach 260a. As with the embodiments described above, the core 252a may comprise a single material, such as steel. FIGS. 3B and 3C illustrate alternative embodiments of a gun barrel (250b and 250c, respectively). In the embodiment of FIG. 3C, a sleeve 252c is provided that extends over the barrel length 12, but terminates at the breech 260c. Alternatively, in the embodiment of FIG. 3B, the sleeve 254b extends over the entirety of the barrel 250b, including the breech 260b.

Figure 3D:
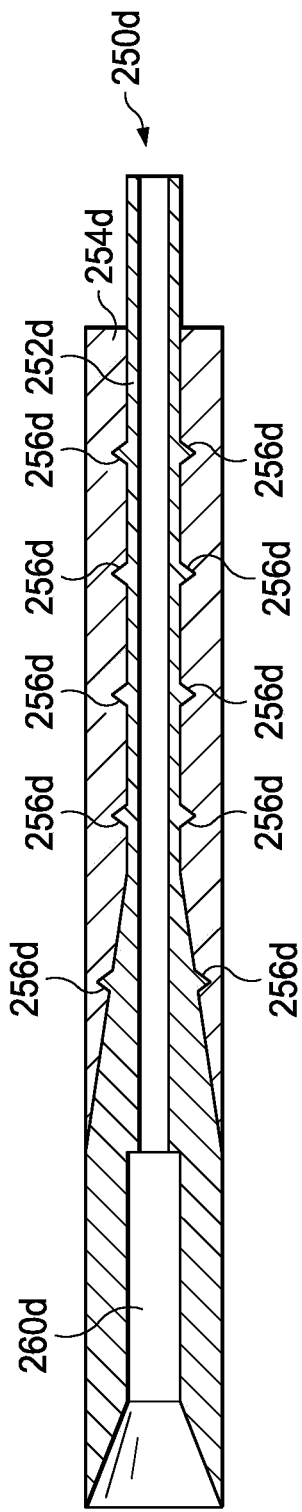

In the embodiment of FIG. 3D is analogous in most respects to the embodiment of FIG. 3B. the sleeve 254d extends over the breech 260b. A portion of the core 252d, however, extends through the sleeve 254d. In addition, a ridge 256d is included on the exterior of the core 252d to engage the sleeve 254d and to ensure that the sleeve 254d remains fixed relative to the core 252d. While the ridge 256d is shown as having a triangular profile, in other embodiments, the ridge 256d may have a rounded profile or a rectangular profile. In still other embodiments, the ridge 256d may be replaced by a groove or detent. In addition, the sleeve 254d may be formed to have a groove or protrusion that is sized to engage the ridge 256d or detent of the core 252d. Further, one or more ridges 256d may be provided at the breach, in the case of an embodiment having a sleeve that extends over the breach, or spaced at regular or semi-regular intervals along the core.

It is noted that while the ridge 256d is shown only with respect to the embodiment of FIG. 3D, it is contemplated that unless the described features are incompatible, each feature from each of the described embodiments may be combined with other features described herein within the scope of this disclosure. For example, a barrel may be provided that includes a sleeve having a longitudinal cross-section that corresponds to the barrel shown in FIG. 3C, a ridge such as that described with regard to FIG. 3D, and a perpendicular cross-section that corresponds to the embodiment of the left side of FIG. 4B.

Figure 3E:
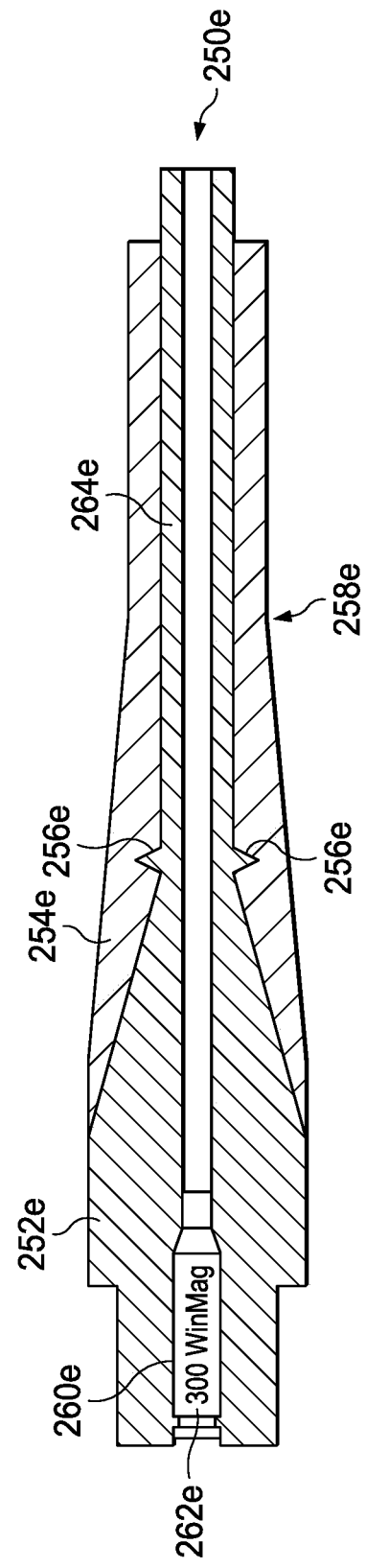

In FIG. 3E, an embodiment is shown in which the sleeve 254e does not extend over the chamber 260e. In this embodiment, the core 252e and the sleeve 254e have dissimilar shapes having distinct and functional differences. The core 252e has a reduced thickness as well as a circumferential ridge/peak 256e which further secures the sleeve 254e when the barrel 250e is assembled. It is noted that an optional intermediate layer 264e may be included between the core 252e and sleeve 254e. In some embodiments, the sleeve 254e has a different geometry from the core 252e. The core 252e is straight over most of its length while the sleeve 254e tapers and has a step 258e as the sleeve 254e transitions from a first end to a step 258e. At the first end, the sleeve 254e has nominal thickness and an outer diameter that is comparable to the diameter of the core 252e. At the step 258e, the taper terminates and the sleeve 254e has an outer diameter that is constant and larger than that of the core 252e due to the expanded thickness of the sleeve 254e until reaching a second end of the sleeve 254e.

Figure 12A:
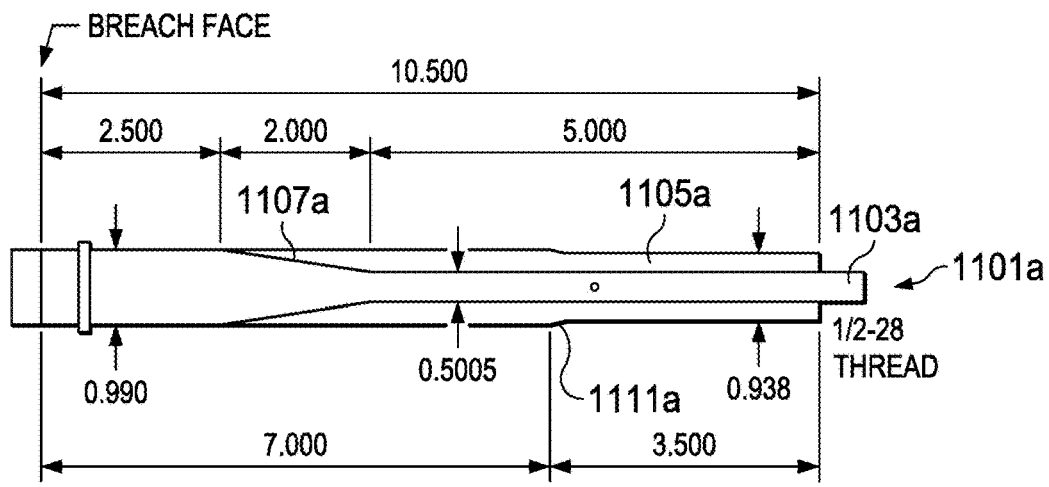
FIGS. 12A-12D show schematic, longitudinal cross sections of a plurality of barrel configurations in accordance with the illustrative embodiments.
Figure 12B:
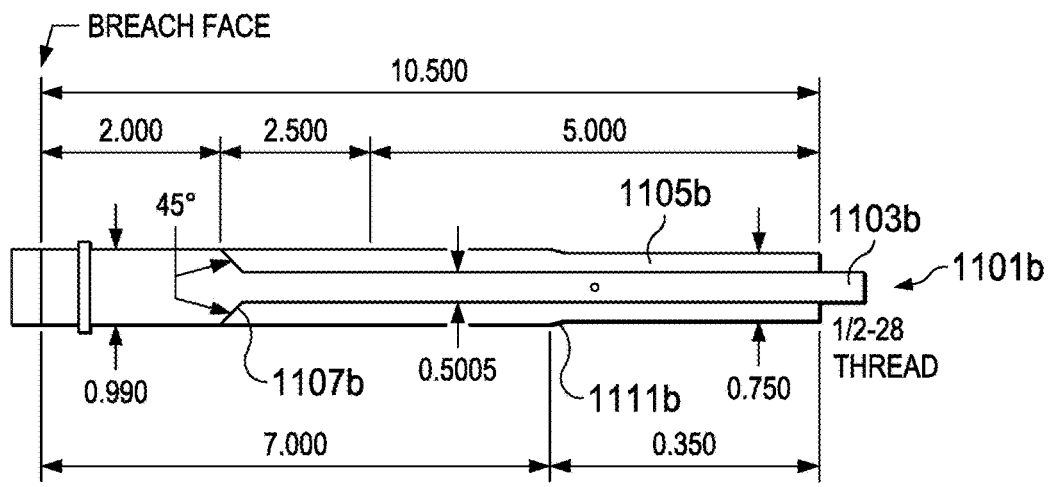

Other geometries are contemplated in FIGS. 12A-12D. Referring to FIG. 12A, for example, it is noted that in the sections of the barrel not covered by the sleeve, pressure resistance of the barrel derives solely from the core. In such embodiments, the transition from the exposed core to the sleeve-covered core can be realized in many ways. The embodiment of FIG. 12A, for example, shows a barrel 1101a having a core 1103a that extends past the end of sleeve 1105a. The sleeve 1105a is joined to the core 1103a at a taper 1107a, which may extend for about twenty percent of the length of the portion of the barrel 1101a that extends beyond the breach face (near the left-hand end of the figure). The sleeve 1105a has a small external shoulder 1111a that is offset from the end of the sleeve 1105 (by, for example, approximately 3.5 inches). The embodiment of FIG. 12B is similar in most respects to the embodiment of FIG. 12A, with the exception that the taper 1107b is shown as having a steeper (45° angle).

Figure 12C:
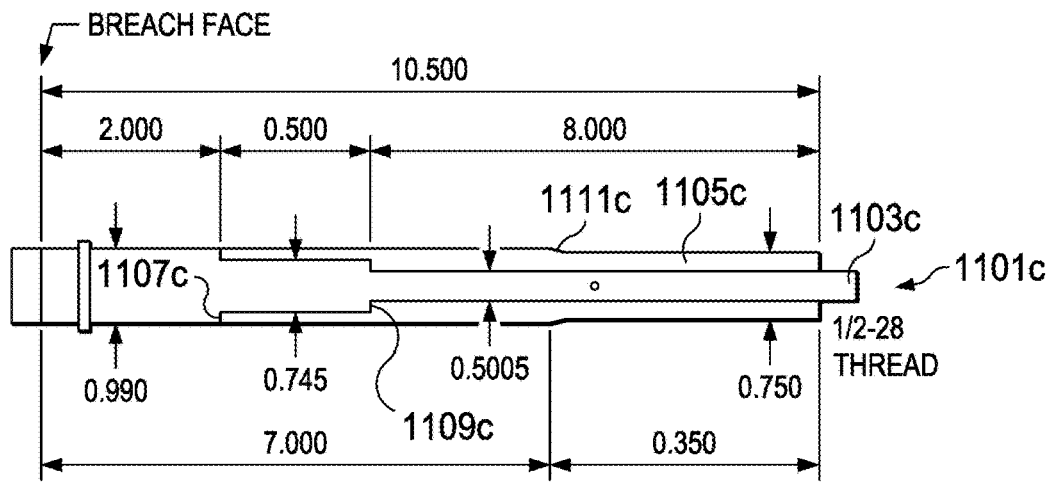
Figure 12D:
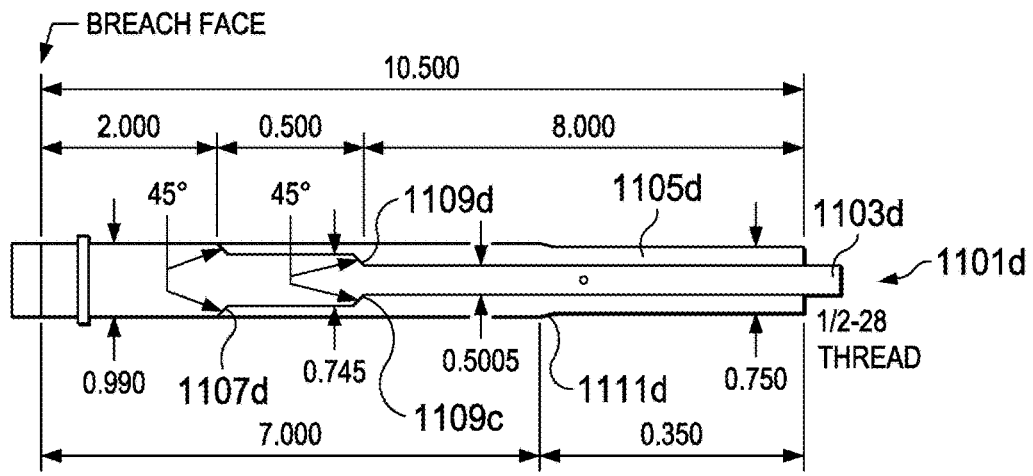

FIG. 12C shows a barrel 1101c that is similar in most respect but instead of a taper, includes a step design having a first step 1107c and a second step 1109c that is longitudinally offset from first step 1107c. Each step 1107c and 1109c provides a flat surface that may be used to further anchor the sleeve 1105c relative to the core 1103c. In lieu of steps, the embodiment of barrel 1101d of FIG. 12D shows offset, sequential tapers 1107d, 1109d, which are illustrated as forty-five degree tapers positioned at 2 units of measurement from the breach face and 2.5 units of measurement from the breach face, respectively. In each of the embodiments of FIGS. 12A-12D, the shoulder 1111a-d is shown (for exemplary purposes) as being offset by 7 units of measurement from the breach face. Here, it is noted that the geometries of the cross-sections shown in FIGS. 12A-12D are shown only for illustrative purposes, and other dimensions and proportional relationships between the dimensions shown are also possible.

Referring again to FIG. 3B, the core 252b may be made from any suitable ceramic, metallic, polymeric, organic, inorganic or composite material thereof, which can withstand the pressure and heat of firing. The core material may also be selected to withstand abrasion sustained as projectiles pass through the barrel bore 250d without being too heavy or thick.

In the illustrative embodiments, the specific strength of suitable core materials may be (1) above 20 N·m/g, (2) better than 50 N·m/g, (3) better than 100 N·m/g, (4) between 200 N·m/g to 500 N·m/g, (5) better than 700 N·m/g, or (6) above 1000 N·m/g. In some embodiments, the specific strength of the core material is between 50 N·m/g and 500 N·m/g in combination with a specific elastic modulus between 1 to 100 GPa cm$^3$/g, other suitable specific elastic moduli are: (1) above 1 GPa·cm$^3$/g, (2) above 10 GPa·cm$^3$/g, (3) above 100 GPa·cm$^3$/g, or (4) above 1000 GPa·cm$^3$/g.

Exemplary materials that are suitable for use in the barrel core include (without limitation) (1) iron and iron alloys/ferrous alloys, especially steels, e.g. 4140, 4150, 416R and reinforced iron materials like metal-matrix materials from iron based alloys; (2) nickel and nickel alloys, e.g. Inconel and reinforced nickel materials like metal-matrix materials from iron/ferrous alloy materials; (3) copper and copper alloys, especially in combination with zinc, tin, nickel and beryllium, commonly referred to as bronze, brass, copper-nickel, Gunmetal and beryllium bronze and reinforced copper materials like metal-matrix materials from the aforementioned copper-based materials; (4) cobalt, cobalt alloys and reinforced cobalt materials like metal-matrix materials; (5) chrome and chrome alloys and reinforced chrome materials like metal-matrix materials; (6) beryllium and beryllium alloys and reinforced beryllium materials like metal-matrix materials; (7) magnesium and magnesium alloys and reinforced magnesium materials like metal-matrix materials; (8) aluminum, aluminum alloys and reinforced aluminum materials like metal-matrix materials from aluminum based materials; (9) molybdenum and molybdenum alloys and reinforced molybdenum materials like metal-matrix materials from molybdenum based materials; (10) niobium and niobium alloys; (11) tantalum and tantalum alloys; (12) titanium and titanium alloys, e.g. different titanium grades and gold-titanium alloys; (13) tin and tin alloys; (14) tungsten and tungsten alloys; (15) osmium and osmium alloys; (16) zinc and zinc alloys; (17) zirconium and zirconium alloys; (18) hard metals; (19) metal carbides, like tungsten carbide; (20) metal bonded ceramics, so called Cermets; (21) sintered ceramics, both carbide and non-carbide ceramics; and (22) other metal-ceramics, e.g. metal or polymer infiltrated ceramics, in which both substituents can be both interconnecting and non-interconnecting/inter-permeating and non-inter-permeating.

As referenced herein, the term alloy, is used to describe any combination, blend and/or mixture of mainly metallic materials and is not to be understood to follow the scientific definition of alloy. For example, the term is intended to include super alloys, base alloys, performance alloys, intermetallic phases, inter-permeating phases and metallic glasses as well as different material grades and reinforced materials. Some materials may or may not be part of one or several of the above-described materials and material classes and such groupings of materials should not be understood to be mutually exclusive. Additionally, in some embodiments, the barrel core may include a functional coating. Examples of such coatings include hard coating that prevent scratching and improve abrasion resistance, and low friction coatings.

In some embodiments, as shown in FIGS. 4A-4E, the barrel sleeve may be selected from a variety of configurations that enhance the stiffness and other mechanical properties of the barrel. For example, in the embodiment of FIG. 4A, an illustrative cross-section of a gun barrel 300, which is analogous to the gun barrel 102 of FIG. 1, includes a steel core 302 and an outer sleeve 316 formed from a matrix material. Voids or channels 304 are formed within the sleeve 316, and may be formed to have cross-sections that appear as circles, parallelograms, arcuate segments, or any other suitable shape.

The embodiment of FIG. 4B is analogous in most respects to the embodiment of FIG. 4A. In the embodiment of FIG. 4B, however, the voids or channels 304 of the gun barrel 310 are populated with granules 306 of filler material, which may be a dampening material. Somewhat similarly, in the embodiment of FIG. 4C the voids or channels 304 of the gun barrel 320 are populated with an insert 308 of filler material, which may be a phase-change material (PCM) or a viscous damper material.

In the embodiment of FIG. 4D, the gun barrel 330 includes a core 302 and a sleeve 314. The sleeve 314 includes radial fins 322. The radial fins 322 may include enlarged sections 324, which may be cylindrical sections as shown, at each distal end of the radial fins 322. To enhance rigidity, the enlarged sections 324 may include a strengthening member 312, which may be a strand or rod of high modulus material.

The embodiment of FIG. 4E is analogous in many respects to the embodiments of FIGS. 4A-4D, and includes many of the features described with respect to such embodiments. For example, the gun barrel 340 includes a plurality of channels or voids 304. The voids 304 may be alternatingly populated with granules 306 and inserts 308, as described above with respect to FIG. 4B and FIG. 4C, respectively. Analogous to the embodiment of FIG. 4D, a plurality of high modulus segments 318, shown here as raised profiles, or ribs, may be spaced about the periphery of the gun barrel 340. Like the enlarged sections 324 of FIG. 2D, the high modulus segments 318 may each include a strengthening member 312.

In most embodiments, but referring again to FIG. 3D, for example, the sleeve surrounds 254d the core 252d, and is made from a light metal or metal matrix material. Suitable sleeve materials include aluminum, scandium, francium, titanium, lithium, beryllium, magnesium, yttrium, calcium, potassium, sodium, barium their alloys, metallic glasses and intermetallic phases (herein further referred to simply as 'alloys') and metal matrix materials based on these light metals and their alloys as matrix materials. For example, matrix materials may include aluminum, titanium, beryllium, or magnesium (or a combination thereof) and their alloys, together with fillers which are having at least the same or better thermal conductivity than the matrix material. For example, the filler material may have a thermal conductivity of more than 100 W/m·K. Such fillers may include carbon nanotubes, graphene, carbon fibers, copper, gold, silver, aluminum nitride, boron nitride, boron nitride nanotubes, beryllium oxide, beryllium, diamond or silicon carbide.

The filler material may be granular in form in some embodiments in which isotropic mechanical properties are desired. In other embodiments, filler particles may be selected that have a high aspect ratio. As referenced herein, the "aspect ratio" denotes the ratio of average particle length divided by the average particle width. High aspect ratio filler particles are therefore elongated, fiber- or whisker-like with an aspect ratio that is generally above 20, which means that the length is more than twenty times the diameter or width.

In addition, in accordance with the illustrative embodiments, the sleeve material may have one or more of the following properties: (A) A linear thermal expansion coefficient of (1) between 0 and 30 ppm/K, (2) between 8 and 24 ppm/K, or (3) between 10 and 15 ppm/K; (B) a specific heat capacity of (1) more than 0.45 J/g·K, (2) between 0.7 and 2.0 J/g·K, or (3) above 2.0 J/g·K; (C) a thermal conductivity of between (1) 50 and 500 W/m·K, or (2) above 500 W/m·K; and (C) a specific tensile strength of (1) at least 80 N·m/g or (2) more than 150 N·m/g, see also Examples 1 and 2.

The foregoing configuration and combination of properties allows for an increased barrel thickness, or outer diameter, relative to a single-material barrel. Such increased barrel thickness (in addition to other factors) significantly stiffens the barrel and enhances performance without significantly increasing barrel weight. Further, the thermal expansion coefficients of the sleeve/sleeves $254d$ and the core $252d$ may be closely matched to reduce the risk of separation at increased temperatures, detailed in Example 1.

The foregoing description of barrel configurations utilizes a combination of materials, design and joining techniques to provide numerous enhancements. As noted, the material used to form the sleeve $254d$ may have a higher thermal conductivity and specific heat capacity than that of the core $252d$. The effect of such increased thermal conductivity and specific heat capacity is to more evenly distribute heat along the barrel $250d$, which has the effect of reducing the risk of hot spots. In addition, the increased external surface area of the barrel $250d$ improves heat dissipation which, when coupled with the enhanced thermal conductivity of the sleeve $254d$ provides for more efficient cooling and corresponding delayed heating of the barrel $250d$ during firing. Head dissipation may be further enhanced by altering the shape of the sleeve $254d$, as described with regard to FIGS. 4A-4E.

In some embodiments, e.g., the embodiments of FIGS. 2B and 2C (but referencing FIG. 2C for brevity), the core $152c$ and sleeve $154c$ may have generally cylindrical shapes. For concentric barrel designs the stiffness S is calculated from the second moment of inertia I:

$$I=\pi/4 \cdot (R^4-r^4),$$

where R is the outer radius of the barrel and r is the radius of the bore. The stiffness S is calculated by multiplying the second moment of inertia I with the material's elastic modulus E:

$$S=E \cdot I=E \cdot \pi/4 \cdot (R^4-r^4).$$

In the case of a composite barrel there are at least three radii, r the radius of the bore $156c$, $R_1$ the outer radius of the core $152c$ and $R_2$ the outer radius of the sleeve $154c$, as well as two elastic moduli $E_1$ of the core $152c$ and $E_2$ of the sleeve $154c$. The moments of inertia of the core $I_1$ and of the sleeve $I_2$ add up to the total moment of inertia $I_{total}$ and the total stiffness Swat is formed by the contributions of core $152c$ and sleeve $154c$, as given by the following equations:

$$I_{total}=I_1+I_2=\pi/4 \cdot (R_1^4-r^4)+\pi/4 \cdot (R_2^4-R_1^4)$$

$$S_{total}=E_1 \cdot I_1+E_2 \cdot I_2=E_1 \cdot \pi/4 \cdot (R_1^4-r^4)+E_2 \cdot \pi/4 \cdot (R_2^4-R_1^4).$$

Examples based on different material combinations and resulting changes in the stiffness are given below in Example 3 & 4.

In other embodiments one or both of the core and sleeve may have a fluted, tapered, stepped, and/or ribbed outer surface (see, e.g., FIGS. 2D-2F), or a combination of these features. In an embodiment in which the core includes a fluted outer surface, however, the sleeve may include an inner surface that complements and surrounds the fluted outer surface of the core. To that end, the core may be generally cylindrical or may have any other suitable shape.

FIGS. 5A-5D show various embodiments of multi-material composite barrels. Generally, the variations shown lie in the extension of core in the sleeve as well as in the core thickness. In FIG. 5A, the barrel $400a$ includes a core $404a$ having a bore $402a$. The core $404a$ is enclosed by a sleeve $406a$ that extends over the breach or chamber $408a$ at a first end and to the end of the barrel $400a$ at a second end. The core $404a$ also covers the whole length of the barrel $400a$ and also forms and contributes to the chamber $408a$ and has a macroscopic thickness of 1 mm or more.

The embodiments of FIGS. 5B-5D have many similar features, which may not be discussed for brevity. In FIG. 5B, the core $404b$ extends only partly (e.g., approximately half-way) into the length of the barrel $400b$. The sleeve $406b$ therefore comprises a portion of the bore $402b$ in addition to rifling that forms the barrel $400b$. In some embodiments, the barrel $400b$ is coated with a hard coating to reduce wear, e.g. being electroplated with chrome or diamond like carbon (DLC) coatings produced by chemical vapor deposition (CVD). The thickness of the core $404b$ may vary. For example, the core $404b$ may have a greater thickness at the chamber $408a$ than in the bore $402b$ of the barrel $400b$.

In the embodiment of FIG. 5C, the core $404c$ only extends partly (e.g., less than halfway) into the length of the barrel $400b$. In such an embodiment, the core $404c$ has a minimal thickness and may be formed by, for example, applying a coating to the interior surface of the sleeve $406c$. For example, the coating may be a diamond-like carbon (DLC) coating applied by chemical vapor deposition or electro plating with chrome to the interior surface of the sleeve $406c$. Further, the core $404c$ may form only a shoulder $410c$ or "choke" and not form the whole of the chamber $408c$.

In the embodiment of FIG. 5D, the barrel $400d$ includes a core $404d$ having a reduced thickness, which may be formed as a coating of the sleeve $406d$, such as those described above. The coating layer may change in thickness and material along the barrel. For example, a first coating material may be applied at the interior of the sleeve $406d$ to form a first portion $412d$ of the core $404d$ and a second coating material may be applied to form a second portion $414d$ of the core $404d$. The first portion $412d$ and $414d$ may alternatively be thicker material layers such that the first portion $412d$ and second portion $414$ may be joined with the sleeve $406d$ in accordance with any suitable fabrication method. In order to prevent gaps between the sleeve $406d$ and the first portion $412d$ and second portion $414d$ of the core $404d$, the surface of the bore $402d$ may be plated or coated to ensure a smooth transition over the different material sections.

In the embodiments of FIGS. 2-5, the barrel and the core may have identical or similar coefficients of thermal expansion (CTE), thereby facilitating direct joining of the barrel to the core. CTE is normally given in the unit parts per million per Kelvin (ppm/K). In order for sleeve and core to have thermal and mechanical integrity, it is desirable that there be little or no mismatch between the core and the barrel over the whole operating temperature range of the weapon. Former attempts to make bimetal composite barrels (e.g. from aluminum and steel) failed due to the fact that this criteria was not met, and the difference in thermal expansion coefficients for steel and aluminum is too large (12.4 ppm/K for 4140 steel and 23.6 ppm/K for 7075 Aluminum).

In some embodiments that feature light metals and metal-matrix sleeve materials, as disclosed herein, this is not the case. The thermal expansion coefficients of such materials differ by less than 50% from the core materials and in some cases by less than 25% (see Example 2). In such embodiments, two methods may be employed to ensure the mechanical and thermal integrity between the core and the sleeve over the operating temperature range of the weapon.

The first method involves using an interference fit, which may be achieved by shrink fitting, as described below. Here, interference implies that the core has a diameter that is larger than the opening in the sleeve so that the two parts interfere when assembled together. The extent of the desired amount of interference depends on the difference in thermal expansion coefficients between the parts to be joined, the temperature range through which the joint is to be maintained, and the localized geometry:

$$If = \Delta CTE \cdot \Delta T \cdot D,$$

where If is the Interference, $\Delta CTE$ is the difference in thermal expansion coefficients, $\Delta T$ is the temperature range in Kelvin and D is the local diameter of the core for where the interference is calculated.

The second method is to have an intermediate thin layer (coating or plating or foil) of another material between the core and the sleeve, wherein the thin layer has a higher thermal expansion coefficient than the sleeve material. In operation, the intermediate layer is confined between the sleeve and the core, and expands more rapidly during heating than each of the core material and the sleeve material. As such, the intermediate layer remains in compression between the core and the sleeve, and thereby constantly exerting pressure and maintaining thermal contact between the core and the sleeve. In such embodiments, the intermediate layer may be selected to have better thermal conductivity than the core material and similar or better thermal conductivity than the sleeve to mitigate possible insulating effects of the intermediate layer.

Manufacturing Methods

The manufacturing methods of before outlined gun barrel disclosed herein may be formed using any suitable manufacturing process including, for example, extrusion and/or milling and joining by thermal shrink-fitting, casting, machining, over-molding, additive manufacturing (3-D printing), flow forming/metal spinning and combinations thereof.

Figure 6A:
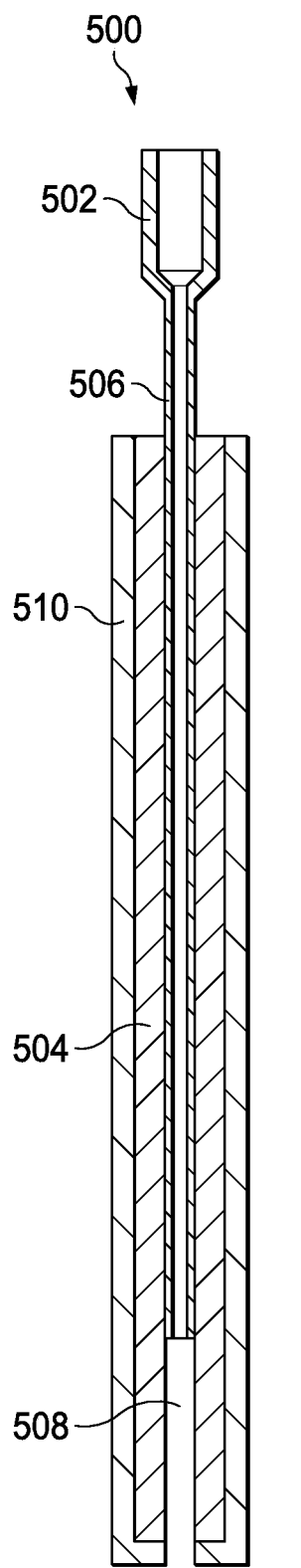
FIGS. 6A-6B show schematic, longitudinal cross-sections of weapon barrels to illustrate a first process for fabricating a weapon barrel in accordance with an illustrative embodiment.
Figure 6B:
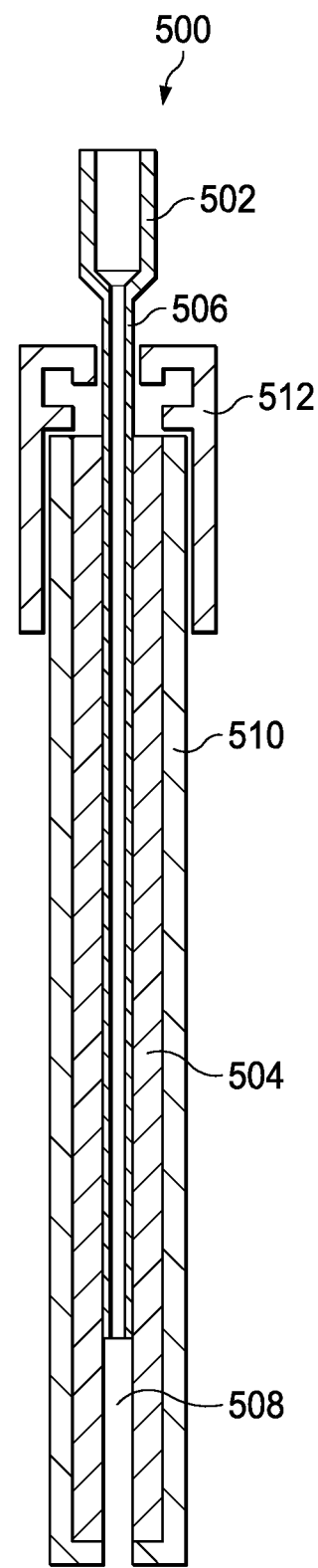

A method for forming a barrel 500 using a press-shrink-fit manufacturing technique is described with regard to FIGS. 6A and 6B. In accordance with the illustrative method, a sleeve blank 504 is provided and heated to a malleable state. In an embodiment, the sleeve blank 504 is formed from an MMC material. Following heating of the sleeve blank 504, a barrel core 502 is pressed into the bore of the sleeve bank 504. The sleeve blank 504 includes a first hollow region 506 that is sized and configured to receive the breach portion of the barrel core 502 and a second hollow region 508 to receive the remainder of the barrel core 502. In some embodiments, the press-fit operation is performed when the sleeve blank 504 is stabilized within a mold 510, which may include or be used with a guide block 512. Use of the mold 510 may prevent warping of the sleeve blank 504 during the joining process. After the barrel core 502 is pressed into the sleeve blank 504, the sleeve blank 504 is allowed to cool and contract, thereby forming a compressive joint between the sleeve blank 504 and barrel core 502.

Figure 7A:
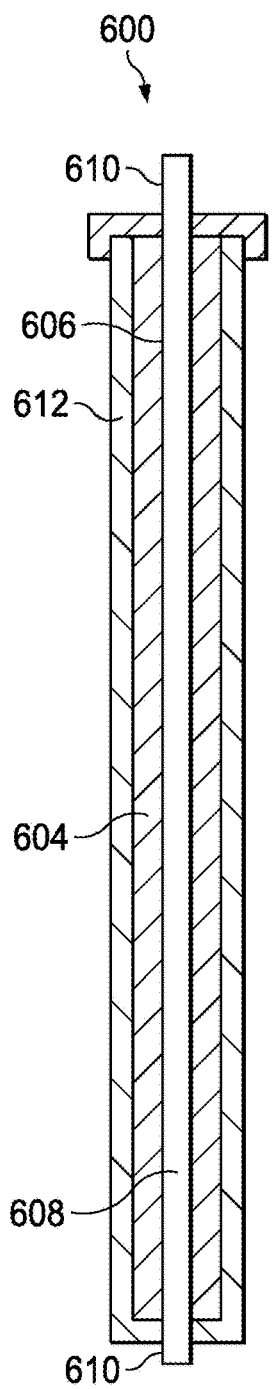
FIGS. 7A-7C show schematic, longitudinal cross-sections of weapon barrels to illustrate a second process for fabricating a weapon barrel in accordance with an illustrative embodiment.
Figure 7B:
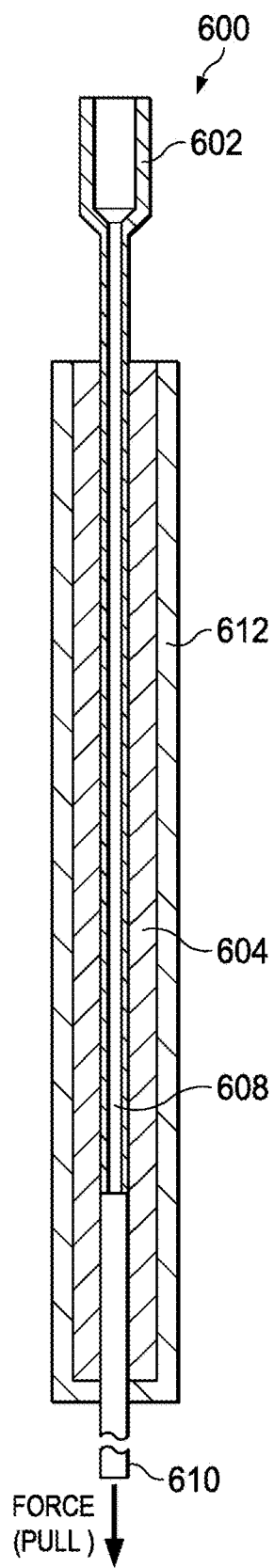
Figure 7C:
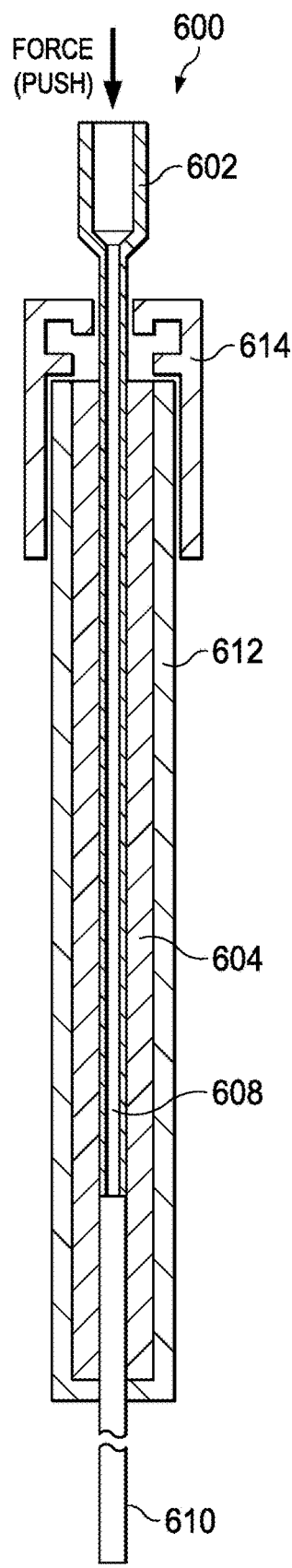

In similar illustrative method is described with regard to FIGS. 7A-7C. This method is analogous to the method described with regard to FIGS. 6A and 6B, with the exception that the barrel core 602 is assisted in the press-fit operation by a tensile member 610 that is temporarily joined (e.g., by external threading or internal threading that may be subsequently bored out) to the barrel core 602 to pull the barrel core 602 into the sleeve blank 604 as it is being press-fit into the hollow regions 606, 608 of the sleeve blank 604. The tensile member 610 may be a pull-rod, cable, or similar device.

In accordance with the illustrative method, a sleeve blank 604 is provided and heated to a malleable state. Following heating of the sleeve blank 604, a barrel core 602 is pressed into, and simultaneously pulled into (by tensile member 610), the bore of the sleeve bank 504. The sleeve blank 604 includes a first hollow region 606 that is sized and configured to receive the breach portion of the barrel core 602 and a second hollow region 608 to receive the remainder of the barrel core 602. In some embodiments, the press-fit operation is performed when the sleeve blank 604 is stabilized within a mold 612, which may include or be used with a guide block 614 and may extend over all or a portion of the barrel 600. Use of the mold 612 may prevent warping of the sleeve blank 604 during the joining process. After the barrel core 602 is pressed (and pulled) into the sleeve blank 604, the sleeve blank 604 is allowed to cool and contract, thereby forming a compressive joint between the sleeve blank 604 and barrel core 602.

In a preferred embodiment, the joining and manufacturing methods applied achieve a mechanical and thermally resilient joint between the sleeve and core by a combination of an interference fir and a form fit. The joint is formed to maintain structural and thermal integrity over the full range of the weapon's operational temperature and mechanical stress. In some embodiments, an interference fit facilitates the achievement of the desired joint. The interference fit provides a strong, structural, mechanical and thermal load-bearing joint. As described above, the manufacturing process may be viewed as comprising the following steps: (a) cutting or machining the inner sleeve contour into a semi-finished sleeve or blank (which may include forming an annular, circumferential groove); (b) cutting or machining the core contour from semi-finished barrel or barrel blanks with the desired magnitude of interference and the annular, circumferential ridge; (c) heating the sleeve and cooling the core to expand the sleeve and to shrink the core; (d) sliding the parts onto/into each other; (e) allowing the parts to attain thermal equilibrium; and (f) finishing the barrel by machining final features like fluting, taper, boring, rifling, gas vents, cooling fins, striating, plating, tempering, engraving, etc.

Cooling the core and heating the sleeve provides the room necessary for the core to be inserted into sleeve by thermally expanding and shrinking the parts respectively. Mating takes place by thermally equilibrating both parts, either by cooling or bringing them to the same temperature. The temperature difference during the first stage of joining is high enough to provide enough room for both parts. Heating can take place by continuously heating the sleeve in an oven either by inductive, radiation or convective heating, either in a mold or free-standing. If a mold is used, the mold material will have a melting point that is higher than that of the sleeve material, or at least higher than the working temperature of the sleeve during the forming process. Suitable mold materials are graphite, steel, copper, and the like. Inductive heating in a graphite mold has proven to be a suitable method because it allows the fast application of thermal energy in the sleeve and keeps the sleeve thermally stable during the insertion of the core. Once inserted, the core may act as a cooling rod that may cause cooling of the sleeve. Cooling may also be effected by exposure to liquid nitrogen.

An alternative embodiment of the manufacturing process, also resulting in an interference fit is a press-molding-technique. The manufacturing process may be viewed as comprising the following steps: (a) cutting an inner sleeve contour into a semi-finished sleeve or blank; (b) cutting a core blank from semi-finished barrel or barrel blank with the desired interference (such that the core blank and sleeve blank may still have an interference fit, or very close to an interference fit, even when the sleeve blank is subsequently heated); (c) placing the hollowed out sleeve into a mold; (d) heating both mold and sleeve to a temperature between the softening point and the melting point of the sleeve; (e) pressing the core/core blank into the softened sleeve or allowing the sleeve material to flow around the annular, circumferential ridge and thereby form the corresponding groove; (f) allowing the parts to thermally equilibrate and/or to cool down to room temperature; and (g) finishing the barrel by machining final features like fluting, taper, gas vents, cooling fins, striating, plating, tempering, engraving etc.

As described above with regard to FIGS. 6A-6B and 7A-7C, pressing the core into the softened sleeve provides a fast method to join the parts, prevents bending, and also allows to surface structure the sleeve at the same time, so that a near net shape part is obtained. The precut hollowed portion of the sleeve and the dimension of the mold in combination with the mass of the sleeve material allow predetermining the interference. Mating takes place by thermally equilibrating both parts, either by cooling or bringing them to the same temperature. Heating can take place by continuously heating the sleeve in an oven by inductive, radiation, or convective heating, either in a mold or free-standing. During the press operation, a plug can be inserted into the barrel core (assuming it is already bored) to prevent sleeve material from entering the bore. An alternative embodiment of this manufacturing process is 'pull-molding' (as described with regard to FIGS. 7A-7C). In such an embodiment, the barrel is not pressed into the softened sleeve but is pulled into it. Pulling has the advantage that the danger of bending during the mating is lower than during pushing. To that end, pulling may be done assistively or in lieu of pressing. For this operation, a threaded interface can be used to attach a pull-rod or rope to the core blank, and can be later cut off or be used to attach other accessories (e.g. a muzzle break or a flash hider). These manufacturing methods are suitable for medium and large scale production.

In accordance with another embodiment, injection molding can be used to manufacture the barrel and also provide an interference fit. The manufacturing process may be viewed as comprising the following steps: (a) cutting a core blank from a semi-finished barrel or a barrel blank with the desired interference; (b) placing the core blank in a mold which has a volume of sleeve at a temperature at which the sleeve material will be injected; (c) injecting the softened sleeve material into the mold; (d) allowing the parts to thermally equilibrate and/or to cool down to room temperature; and (e) finishing the barrel by machining final features like fluting, taper, gas vents, cooling fins, striating, plating, tempering, engraving, etc.

Injection molding a sleeve onto a core provides a fast method to join the parts, prevents bending, and also allows to surface structure the sleeve at the same time, so that a near net shape part may be obtained. The volume of the mold and the injected sleeve material are important for the success of this method since they determine the quality of the joint of the finished barrel. Additionally, since metal matrix materials may be used, phase separation of the filler and the matrix is prevented by either working the material in the softened state or the lower liquid state at which the viscosity is still high enough to prevent phase separation.

By way of example, thixotropic injection techniques, also called semi-solid casting, are suitable for this kind of manufacturing. In such an embodiment, formation of the mechanical and thermal load bearing joint takes place by thermally equilibrating both parts. To prevent high thermal stress during the injection the core can be heated and, if already bored, by further supported by an inserted rod that is configured to transmit heat to the core. This manufacturing method is also suitable for large scale production.

Interference Fit/Interference Fit

As referenced herein, press-shrink-fitting denotes a manufacturing technique that takes advantage of a property of metal matrix materials that have a broad range below the melting point in which the materials are malleable. In accordance with an associated method, a sleeve blank, which may be hollowed out to accept a barrel core, can be placed in a mold and heated to a temperature at which it becomes malleable. A barrel core may also be pre-heated (and may or may not be already bored, chambered and rifled) but already has the circumferential, annular ridge. The barrel core is then pressed into the sleeve by force, and both parts are then allowed to thermally equilibrate and to cool down. During cooling down, the sleeve contracts around the core and the core may expand into the sleeve, thereby forming a force-bearing fit that is similar to the aforementioned shrink fits. In such processes, the sleeve is sufficiently malleable to plastically deform and not to break when the core is inserted. It follows that it may also be possible to press a barrel core into a piece of soft malleable metal matrix material without the necessity to pre-drill the sleeve. In accordance with this process, a mold around the sleeve keeps the material in place and prevents the metal-matrix material sleeve from bending. This process may further be used to pre-shape the sleeve during the joining process.

In some illustrative methods, the steel core is pulled instead of pushed into the sleeve, as described above with regard to FIGS. 7A-7C. In application of the foregoing process, the sleeve is drilled with a guide-hole that allows a pull-cable, rod, chain, or other tensile member to be inserted, which is used to pull the barrel core into the sleeve. An advantage of pulling is that the core aligns within the sleeve, guided by the guide-hole. Accordingly, the core is less prone to bending and misalignment during the joining process, compared a simple press-fit operation.

Hipping

Hot isotactic pressing (HIP or hipping), is a manufacturing technique in which a component is subjected to both elevated temperature and isotactic gas pressure in a high pressure containment vessel. The pressure is applied from all directions and hence the term 'isotactic' is used. The method can be used to consolidate powders or reduce the porosity of already solid parts. This process can be used to hip the sleeve directly onto the barrel core by consolidating a metal matrix powder or a semi-finished barrel blank around either a core blank or an already chambered and rifled barrel blank. This technique provides for a strong and robust joint between the sleeve and the core.

Hot isotactic pressing processing parameters for (for example) an aluminum based MMC are in a temperature range around 500° C. and a pressure range of 45 to 100 MPa, at which they may be kept for 12 to 48 hours followed by an air cool. This prolonged heating period can affect the steel core's hardness and tensile strength since it is comparable to heat treatment/annealing. To that end, adverse effects can be addressed by using quenched steel core and by using the hipping both as a process to join core and sleeve and at the same time to temper or anneal the core and give the barrel the desired hardness and tensile properties.

Final processing may again include chambering and rifling of the core, drilling the gas port, threading the muzzle end and chamber, shaping and surface patterning the sleeve, polishing and plating etc.

Powder Consolidation

An alternative approach to manufacture the composite barrel is to surround the barrel core with an MMC tube, and to fill a gap between the tube and the exterior of the barrel core with an MMC powder. The powder may be identical in composition with the outer tube. The powder is then heated and sintered to consolidate the powder to the desired density and thereby create a force-bearing and thermal load-bearing conductive joint between the core and the outer tube. Whereas 'sintering/to sinter' is understood here as compacting and forming a solid mass of material by heat and/or pressure, without melting it to the point of liquefaction. An advantage of this manufacturing method is that it provides for little thermal stress on the structure as well as reduced applied pressure to achieve a high degree of consolidation of the powder.

In a powder consolidation process, the porosity of the sleeve can be adapted in a certain range and thereby mechanical and thermal properties can be tuned. For example, if there is a slight porosity maintained, then the vibration damping properties of the sleeve will be increased, while tensile strength and thermal conductivity are reduced. Here, a balance is struck between the different properties to achieve a combination that both allows the barrel to perform thermally and mechanically on the top of the barrel's operating limits. Since the powder's degree of compaction can easily be above 90% and above 95% of the theoretical bulk density it offers a fast and easy way to complete composite barrels with nearly identical properties to hot isotactically pressure joined composite barrel, without the need of exposing the steel core to high thermal stress. It also allows the use of different material combinations of fill-powder and outer tube, thereby giving more design liberties than monolithic sleeves described before. In order to ease manufacturing, pre-pressed, semi-finished filler-cores can be produced and then inserted into a void between the outer tube and the core, and then consolidated into the void. This is shown schematically in FIGS. 8A-9B.

Figure 8A:
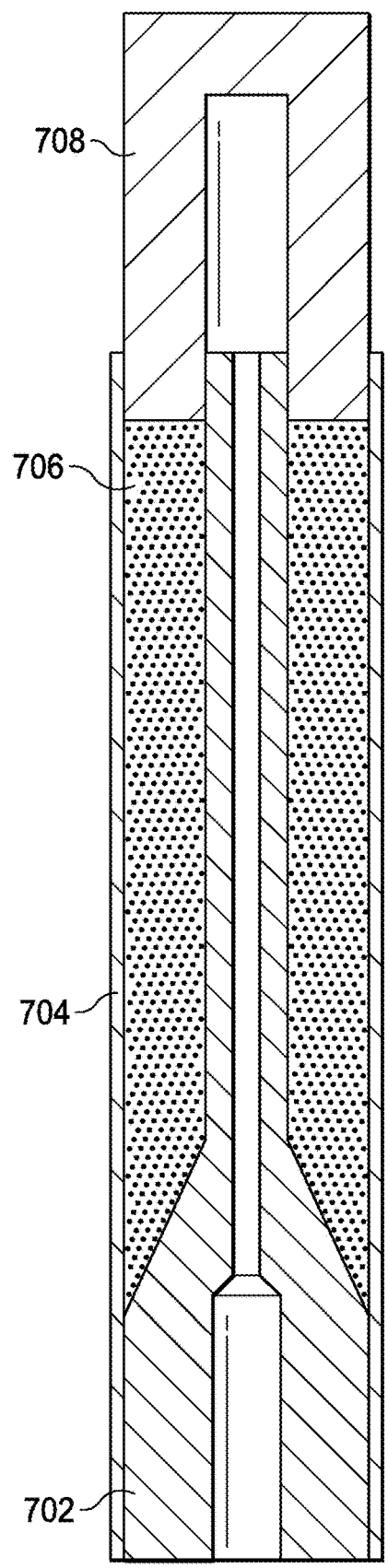
FIGS. 8A-8B show schematic, longitudinal cross-sections of weapon barrels to illustrate a third process for fabricating a weapon barrel in accordance with an illustrative embodiment.
Figure 8B:
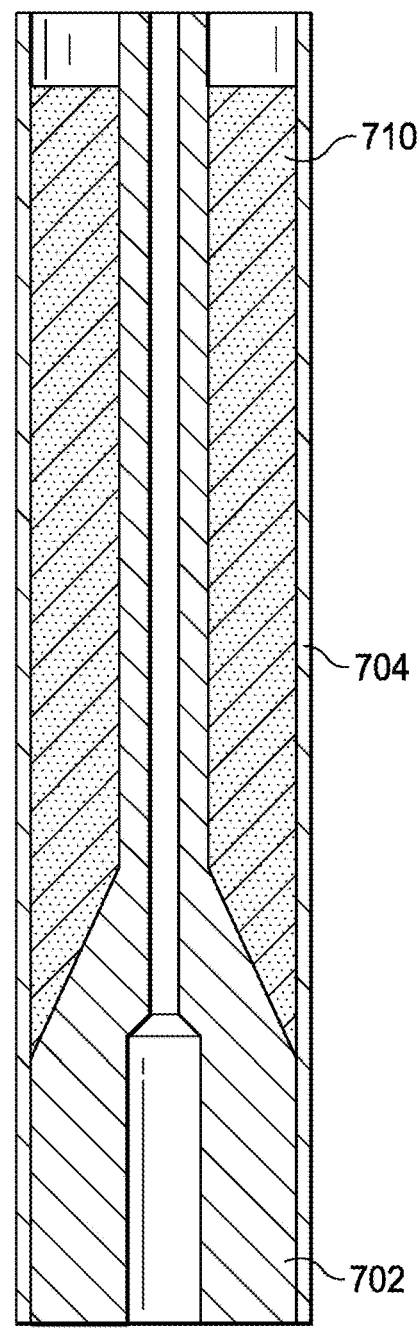

In the illustrative process of FIGS. 8A and 8B, a barrel core 702 is surrounded by a thin walled MMC or other suitable material tube 704 that may ultimately form the external surface of a sleeve. The gap between the core and the tube is filled with a loose MMC powder 706, which is then consolidated by pressing and compacting the MMC powder 706 with a dye 708. FIG. 8B shows the powder having been compacted to form a stable MMC filler layer 710 within the tube 704 to form an external sleeve.

Figure 9A:
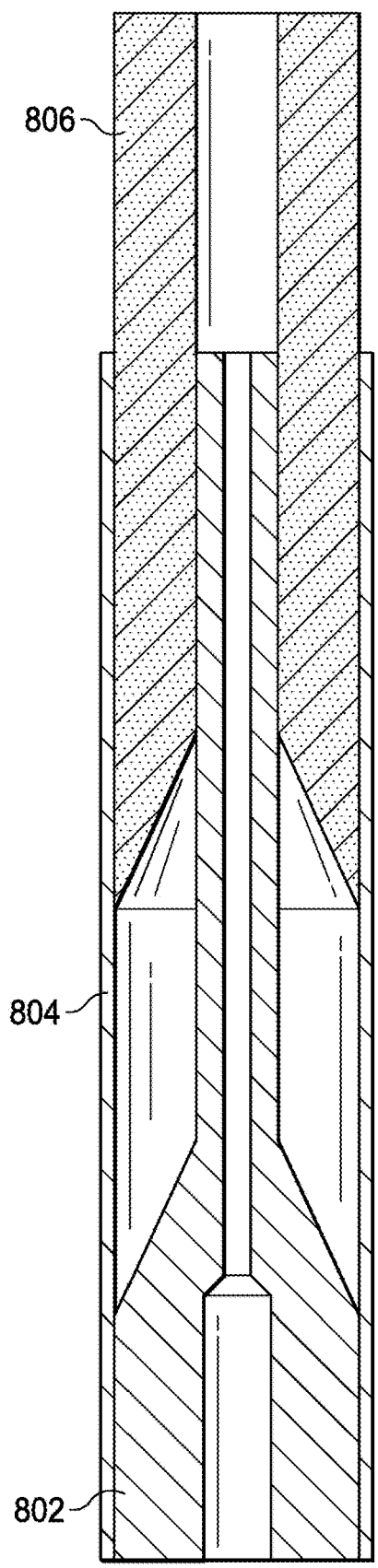
FIGS. 9A-9B show schematic, longitudinal cross-sections of weapon barrels to illustrate a fourth process for fabricating a weapon barrel in accordance with an illustrative embodiment.
Figure 9B:
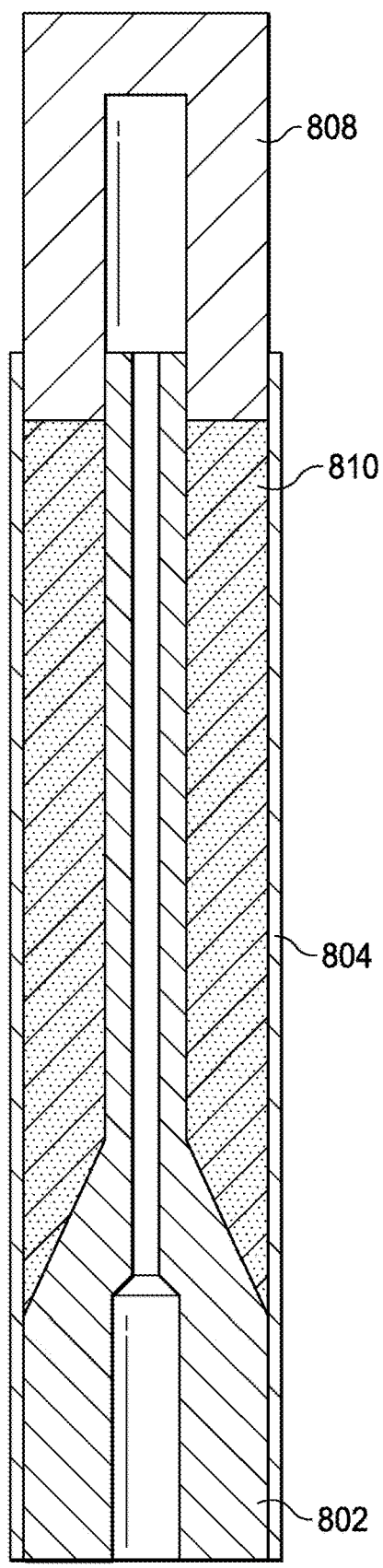

Another illustrative process is shown in FIGS. 9A and 9B, and is analogous in most respects to the embodiment of FIGS. 8A and 8B. In this embodiment, a pre-shaped lightly consolidated green 'gap-core' 806 is inserted into the gap between the tube 804 and core 802 in lieu of powder 706. The gap-core, is a generally cylindrical component formed from a material similar or identical to the powder that has already been compacted (e.g., 80% compacted relative to a completed sleeve) to the extent necessary to maintain a solid shape, but may still be further compactable. The gap-core 806 is subsequently compacted with a dye 808 to form a stable MMC filler layer 810 within the tube 804 to form an external sleeve. In some embodiments, a sintering step may be later performed to better solidify the filler layer (710 or 810).

Explosion Welding

Explosion welding is a solid state process in which the joining of a sleeve and core is accomplished by accelerating one of the components to extremely high velocities relative to each other. This acceleration may be achieved by an explosive compound, and the corresponding manufacturing process is capable of bonding two metals that may not be weldable by conventional means. In the explosion welding process, the constituent metals do not melt, but rather plasticize at their surfaces, bringing the materials into intimate contact and also creating a weld-bond.

The explosion welding technique is very suitable to produce simple geometries like plates and tubes. Accordingly, this technique is suited to join the sleeve on the core by imposing a hollowed out sleeve blank over the core, covering it with a suitable explosive and joining core and sleeve by igniting the explosive. Further processing may include but is not limited to chambering and rifling of the core, drilling the gas port, threading the muzzle end and chamber, shaping and surface patterning the sleeve, polishing and plating, etc.

Metal Spinning/Flow Forming/Shear Spinning/Shear Forming

Figure 15:
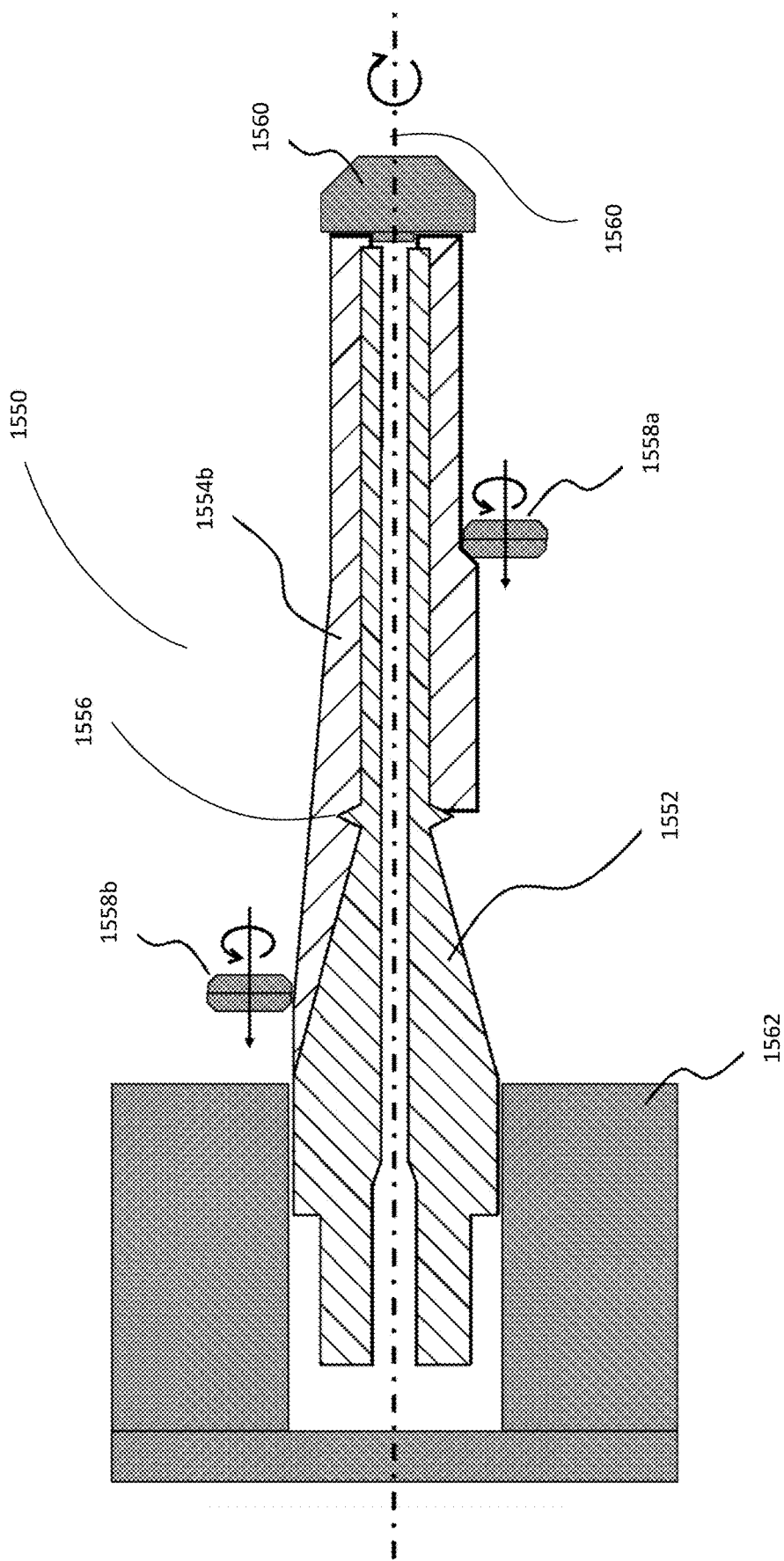
FIG. 15 shows a split view of an illustrative weapon barrel being fabricated using the process of flow-forming.

Referring now to FIG. 15, in another illustrative embodiment, a weapon barrel is made by flow forming (which may also be referred to as metal spinning, shear spinning, or shear forming). In the flow forming fabrication process, a disc, tube or preform are rotated at high speed and formed into an axially symmetric part on a mandrel bar roller or rollers. In this case a sleeve preform, or billet, is formed into barrel sleeve 1554b while the barrel core 1552 acts as a mandrel. To act as a mandrel, the barrel sleeve preform is fixed between a tail stock 1560 and a head stock 1562 or spindle. The sleeve preform is then rotated about an axis of rotation 1564 while one or more rollers 1558a, 1558b are forced into contact with the sleeve preform to cause the preform to deform and take the desired shape of the completed sleeve 1554b.

In the embodiment of FIG. 15 the portion of the sleeve 1554a that appears below the axis of rotation 1564 shows a partially formed sleeve 1554a being engaged by a roller 1558a at a first time. At the first time, the roller 1558a has only deformed an outer portion of the sleeve 1554a and the relative movement of the sleeve 1554a along the axis of rotation 1564 causes the roller 1558 to continually engage and deform the sleeve 1554a until it reaches its desired shape. Correspondingly, the portion of the sleeve 1554b that appears above the axis of rotation 1564 shows a the fully formed sleeve 1554ba that has been formed into shape by the roller 1558b at a second time. At the second time, the roller 1558b has fully formed the sleeve 1554b such that the sleeve 1554*b* is compressively joined to the barrel core 1552 along its length, and encapsulating an annular ridge 1556 to form a permanent joint between the barrel core 1552 and the sleeve 1554*b*.

The described flow forming process can be done cold, but in a preferred embodiment both the barrel core 1552 and sleeve preform are heated up to at least 200-600° C. or to a temperature within 50 to 90% of the sleeve's melting temperature to make the sleeve material more workable. After the sleeve 1554*b* is formed around the barrel core 1552, both parts are given time to thermally equilibrate. This flow forming process results in a form fit of the sleeve 1554*b* around the annular, circumferential ridge 1556 helping to facilitate a permanent joint that also results from an interference or shrink fit that results from the cooling of the sleeve 1554*b* and barrel core 1552.

Alternative Joining Methods

For the sake of completeness, there are several alternative manufacturing techniques that allow the construction of a barrel having an MMC sleeve and barrel core. Examples of such manufacturing techniques are listed below.

Smiting: Similar to hammer forging, the sleeve can be forged onto the barrel core imposing a hollowed out sleeve blank onto the barrel core, which then is drawn onto itself to decrease the diameter and to forge the sleeve tightly onto the barrel core. The barrel core and sleeve may or may not be heated to improve the joint and/or ease processing or to create a shrink or tighter fit after joining.

Conventional welding: The sleeve is made from one, two or more separate pieces that are arranged around the barrel core and then welded together, e.g. by steer-welding. For this process, the sleeve parts may or may not be heated to shrink after joining and to create a shrink or tighter fit.

Soldering: The sleeve may be made from one, two or more separate pieces, which are arranged around the barrel core and then soldered together. The sleeve parts may or may not be soldered to the barrel core as well. For optimal performance at high temperatures, a hard solder is preferential. The sleeve parts may be heated to facilitate shrinking after soldering to create a shrink or tighter fit. The sleeve may be made from one or several separate parts, which in turn can lock into/onto each other and or the barrel core, and may be joined by a forging process.

Clamping: The sleeve is made from one, two or more separate pieces which are arranged around the barrel core and then clamped together and onto the core, e.g. by screws and screw holes integrated in the sleeve or other clamp/tightening devices, for this the sleeve parts may or may not be heated to shrink after joining and to create a shrink or tighter fit. The sleeve may or may not be made from one or several separate parts, which in turn can screw, clamp, click or join onto/into each other and or the barrel core.

Screw connections: The easiest manufacturing technique to join sleeve and core is to equip both with the corresponding threads and simply screw the sleeve onto the core. This will result in a stable barrel but the voids in the threading may amount to weak points in terms of thermal conduction, structural stability, and structural integrity. Such weak points may effectively reduce the stiffness and thermal performance of a resulting barrel. Moreover, in order to provide sufficient pressure resistance, the core will have to have higher wall thicknesses than the above outlined designs. The sleeve may be made from one or several separate parts, which in turn can screw onto each other and or the barrel core.

Cut Screw Connection: In an embodiment having screw connections, a steel core can be given a cutting thread and the sleeve an incomplete swallow thread. When the core is screwed into the sleeve, the core's threads cut into the sleeve, thereby reducing the disadvantages resulting from voids which may be associated with aforementioned screw connection. In such an embodiment, the sleeve may be made from one or several separate parts, which in turn can screw onto each other and/or the barrel core.

Adhesive Joining: The sleeve may be made from one, two, or more separate pieces, which are arranged around the barrel core and then glued together. The sleeve parts may or may not be glued to the barrel core as well. For optimal performance at high temperatures, a sleeve material of thermally conductive adhesive, such as (but not limited to) carbon nanotubes or exfoliated graphene platelets reinforced epoxy, is preferential. The sleeve parts may be heated to shrink after gluing and thereby create a shrink or tighter fit. The sleeve may or may not be made from one or several separate parts, which in turn can lock into/onto each other and or the barrel core and may or may not be joined by an adhesive.

The features of the above-mentioned embodiments may be implemented in any suitable manner in conjunction with the features of other embodiments described herein. For example, it is possible to secure screw and screw-joints with adhesives. Loctite is the most common and commercially available representative of such adhesives. Such adhesive could be used to secure a screw-on-sleeve on the barrel core. Alternatively, a solder could be added to fill the voids in the thread and also hold the sleeve in place more permanently to prevent unintended loosening of the sleeve. Screws through the sleeve into the barrel core may serve the same function in clamp-on-embodiments.

EXAMPLES

Example 1—Metal Matrix Composition and Properties to Match Barrel Cores a. A common steel like 4150 has a CTE (Coefficient of Thermal Expansion) of 12.6 ppm/K, aluminum of 23.6 ppm/K. A 1 m piece of each steel and aluminum would have a mismatch in length of 11.0 microns after being heated by just one Kelvin. In order to match the CTE's aluminum has to be mixed with a second material with lower CTE, for example with
  i. Silicon carbide with a CTE of 4 ppm/K, results in approximate fractions of aluminum 0.57 to 0.43 SiC.
  ii. Diamond with a CTE of 1.2 ppm/K, results in approximate fractions of aluminum 0.58 to 0.42 diamond.

b. A cobalt-chrome alloy like Stellite 21 has a CTE of 14.1 ppm/K, aluminum of 23.6 ppm/K. A 1 m piece of each Stellite and aluminum would have a mismatch in length of 9.5 microns after being heated by just one Kelvin. In order to match Stellite's CTE aluminum has to be mixed with a second material with lower CTE, for example with
  i. Silicon carbide with a CTE of 4 ppm/K, results in approximate fractions of aluminum 0.52 to 0.48 SiC.
  ii. Diamond with a CTE of 1.2 ppm/K, results in approximate fractions of aluminum 0.58 to 0.42 diamond.

c. A common steel like 4150 has a CTE (Coefficient of Thermal Expansion) of 12.6 ppm/K, a beryllium alloy Beryllium S-200 of 14.5 ppm/K. A 1 m piece of each steel and beryllium would have a mismatch in length of 1.9 microns after being heated by just one Kelvin. In order to match 4150 steel's CTE beryllium has to be mixed with a second material with lower CTE, for example with
  i. Silicon carbide with a CTE of 4 ppm/K, results in approximate fractions of beryllium 0.82 to 0.18 SiC.
  ii. Diamond with a CTE of 1.2 ppm/K, results in approximate fractions of beryllium 0.86 to 0.14 diamond.

To match a cobalt core with beryllium, the following amount would have to be added
  i. Silicon carbide with a CTE of 4 ppm/K, results in approximate fractions of beryllium 0.96 to 0.04 SiC.
  ii. Diamond with a CTE of 1.2 ppm/K, results in approximate fractions of beryllium 0.97 to 0.03 diamond.

Example 2—Properties of Commercially Available MMCs

The table below shows properties of (1) 4150 steel, commonly used in barrels, (2) Stellite 21 a coblat alloy, two commercially available metal-matrix materials (SupremEx 640 and 225, Materion Cooperation, Mayfield Heights, Ohio, USA, and an aluminum-diamond-composite by S. R. Holloway disclosed in U.S. Pat. No. 6,482,248B1 'Aluminium Composite for Gun Barrels'.

|  | 4150 Steel | Stellite 21 | SupremEx 640 | SupremEx 225 | Aluminum-Diamond-Composite |
|---|---|---|---|---|---|
| Density [g/cm3] | 7.85 | 8.31 | 2.90 | 2.88 | 3.10 |
| CTE [ppm/K] | 12.6 | 14.1 | 13.4 | 15.5 | 4-5 |
| Tensile Strength [MPa] | 972 | 724 | 560 | 610 | 379 |
| Specific Tensile Strength [N · m/g] | 124 | 87 | 193 | 212 | 122 |

Example 3—Increased Stiffness and Weight Examples 7.62 mm Caliber

Figure 10A:
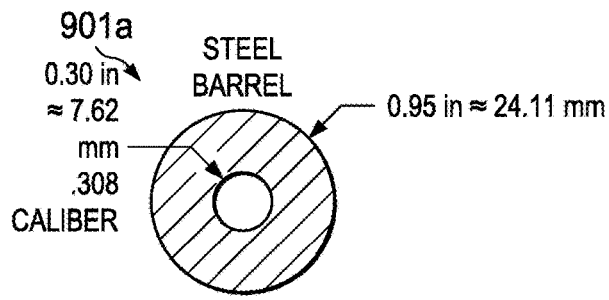
FIGS. 10A-10D show schematic, radial cross-sections of steel barrels and MMC composite barrels for a similar caliber of weapon.
Figure 10B:
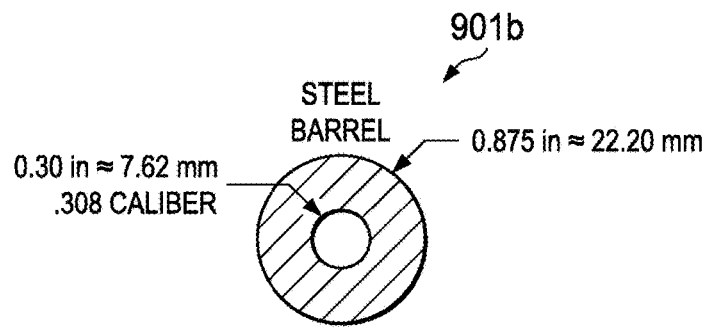
Figure 10C:
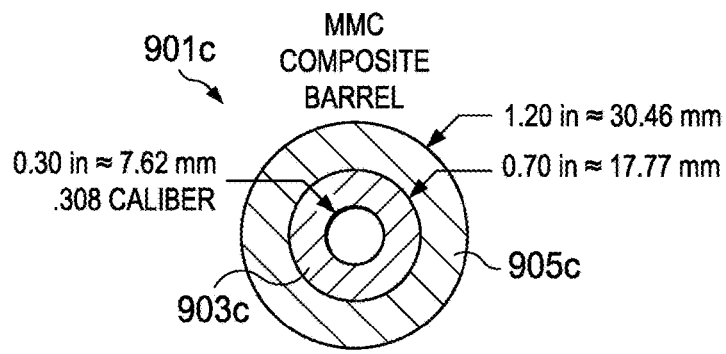
Figure 10D:
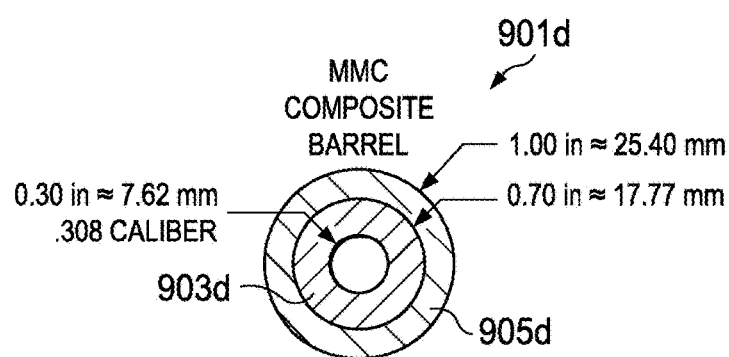

The tables below shows a comparison of (a) physical properties of the steel barrels shown in FIGS. 10A and 10B in 7.62 mm caliber made from 4150/4140 steel with two diameters, commonly found in AR-style barrels, as shown in FIGS. 10A and 10B, to (b) corresponding MMC composite barrels with thick barrel core, in which the steel core is still capable of maintaining the pressure alone. Weight and specific heat capacity are given for 1 mm slices. As an exemplary MMC SupremEx 640, Materion LLC, was chosen.

4140 Steel Barrel, 7.62 mm Caliber

| Material | Diameter [mm] | Diameter [in] | Area Momentum [mm⁴] | Stiffness [N · m²] | Weight [g] | Weight [oz] | Spec. Heat Cap. [J/K] | Surface Area [cm²] |
|---|---|---|---|---|---|---|---|---|
| 4140 Steel | 24.11 | 0.950 | 1.64 E4 | 3.44 E3 | 3.23 | 0.104 | 1.46 | 0.757 |
| 4140 Steel | 22.20 | 0.875 | 1.17 E4 | 2.46 E3 | 2.68 | 0.086 | 1.21 | 0.697 |

Composite Barrel, 4140 Steel Core, SupremEx 640 Sleeve, 7.62 mm Caliber

| Material | Diameter [mm] | Diameter [in] | Area Momentum [mm4] | Stiffness [N · m2] | Weight [g] | Weight [oz] | Spec. Heat Cap. [J/K] | Surface Area [cm2] |
|---|---|---|---|---|---|---|---|---|
| 4140 Steel | 17.77 | 0.70 | 0.47 E4 | 0.99 E3 | 1.59 | 0.051 | 0.72 | — |
| SupremEx 640 | 30.46 | 1.20 | 3.73 E4 | 5.22 E3 | 1.39 | 0.045 | 1.11 | 0.757 |
| Combined | 30.46 | 1.90 | 4.20 E4 | 6.21 E3 | 2.98 | 0.096 | 1.83 | 1.08 |
| 4140 Steel | 17.77 | 0.70 | 0.47 E3 | 0.99 E3 | 1.59 | 0.051 | 0.72 | — |
| SupremEx 640 | 25.40 | 1.00 | 1.17 E4 | 2.17 E3 | 0.75 | 0.024 | 0.60 | 0.798 |
| Combined | 25.40 | 1.00 | 1.64 E4 | 3.16 E3 | 2.34 | 0.075 | 1.32 | 0.798 |

Example 4—Increased Stiffness and Weight Examples 5.56 mm Caliber

|  |  | Bull | Heavy | Medium | Light | Feather | MMC |
|---|---|---|---|---|---|---|---|
| Stiffness Sum | [Nm²] | 1.06 E6 | 0.884 E6 | 0.611 E6 | 0.475 E6 | 0.422 E6 | 0.831 E6 |
| Weight | [g] | 955 | 844 | 686 | 562 | 498 | 621 |
| Heat Capacity | [J/K] | 432 | 381 | 310 | 254 | 225 | 349 |
| Surface Area | [cm²] | 209 | 195 | 177 | 160 | 149 | 209 |

The foregoing table shows a comparison of different 10.5 in in caliber 5.56 mm/.223 barrels. Here, the stiffness is summated over the whole barrel length in 1 mm increments. The values for the MMC barrel refer to the composite barrel shown as FIG. 8—5.56 mm Caliber Barrel, Variant a, diameters can be found there as well.

Example 5—PCM-Materials and E-T-Curves

In the graph of FIG. 11, calculated heat curves are shown for 64 cm (25 in) barrels in different configurations. The calculation is based on an assumed heat deposition of 3500 J per shot into a barrel, which corresponds to the kinetic energy of 7.62 mm round, assuming an efficiency of ⅓ for the heat engine. It is further assumed the PCM barrels have 8 holes of 20 cm length and 4 mm diameter drilled into the sleeve to accommodate different PCM materials, here Rose's metal and gypsum. The base data for the different barrels are as follows:

|  | Weight [g] | Weight [oz] | Specific Heat [J/K] |
|---|---|---|---|
| Steel Barrel (see line 1101) | 1683 | 59.37 | 760 |
| MMC Barrel (see line 1102) | 1593 | 56.19 | 871 |
| MMC Barrel + Rose's Metal (see line 1103) | 1815 | 64.02 | 858 |
| MMC Barrel + Gypsum (see line 1104) | 1710 | 60.32 | 997 |

It can be seen in the graph shown as FIG. 11 that gypsum has a higher latent heat then Rose's metal and can keep the barrel at temperature of 110° C. for more than 20 shots. Cooling effects are not taken into account.

The above-mentioned joining techniques, as well as HIP, might be different but share an inference fit to deliver structural integrity over the temperature range. The extent of the interference depends strongly on the parts dimensions, operation parameters, calibers and intended performance. In some embodiments, it is possible to vary the extent of the inference along the barrel axis and therefore the 'tune' the vibration properties of whole barrel. In the disclosed embodiments, tuning features such as tuning rings and bulges placed at selected locations along the barrel can be partly or fully replaced by sections with higher interference to create zones with higher stress and different vibration properties, thereby forming 'virtual' tuning rings or tuning zones.

It is noted that unless an embodiment is expressly stated as being incompatible with other embodiments, the concepts and features described with respect to each embodiment may be applicable to and applied in connection with concepts and features described in the other embodiments without departing from the scope of this disclosure. To that end, the above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

The invention claimed is:

1. A weapon barrel comprising:
    an inner core having a first end, a second end, a bore extending from the first end to the second end, and an external surface extending from the first end to the second end, the inner core having at least one annular, circumferential ridge extending radially from the external surface, the inner core including a material selected from the group consisting of a ferrous alloy, a non-ferrous alloy, a ceramic, a bonded ceramic, and a cemented carbide; and
    an outer sleeve having a first end, a second end, an internal surface extending from the first end to the second end, and an external surface extending from the first end to the second end, the outer sleeve being disposed around and permanently joined to the inner core, the outer sleeve defining at least one annular, circumferential groove extending from the internal surface, wherein the at least one annular, circumferential groove of the outer sleeve is sized and configured to receive and engage the at least one annular, circumferential ridge of the inner core, wherein the outer sleeve includes a material selected from the group consisting of a metal-matrix composite and a beryllium alloy, the outer sleeve material being located at and between the internal surface and the external surface of the outer sleeve.

2. The weapon barrel of claim 1, wherein the at least one annular circumferential ridge comprises a plurality of annular, circumferential ridges, and wherein the at least one annular, circumferential groove comprises a plurality of annular, circumferential grooves, each of the plurality of annular, circumferential grooves being sized and configured to receive and engage a respective one of the plurality of annular, circumferential ridges.

3. The weapon barrel of claim 1, wherein the inner core comprises an internal core and an intermediate layer joined to an outer surface of the internal core, the intermediate layer being selected from the group consisting of a metal, a metal alloy and a metal-matrix-composite, the intermediate layer facilitating the connection between the outer sleeve and the internal core.

4. The weapon barrel of claim 1, wherein the non-ferrous alloy comprises a material selected from the group consisting of a cobalt alloy and a nickel alloy.

5. The weapon barrel of claim 4, wherein the beryllium alloy has a thermal expansion coefficient that is less than or equal to a thermal expansion coefficient of the nonferrous alloy, and wherein the thermal expansion coefficient of the beryllium alloy is within 15% of the nonferrous alloy.

6. The weapon barrel of claim 1, wherein the metal-matrix composite material comprises:
a matrix material selected from the group consisting of aluminum, scandium, francium, titanium, lithium, beryllium, magnesium, yttrium, calcium, potassium, sodium, barium their alloys, metallic glasses and intermetallic phases; and
a filler material selected from the group consisting of carbon nanotubes, graphene, carbon fibers, copper, gold, silver, aluminum nitride, boron nitride, boron nitride nanotubes, beryllium oxide, beryllium, diamond and silicon carbide.

7. The weapon barrel of claim 6, wherein:
the filler material comprises a granular material evenly dispersed within the matrix material; and
the metal-matrix composite material is less dense than the inner core material and has a thermal expansion coefficient within 15% of a thermal expansion coefficient of the inner core material.

* * * * *